United States Patent
Iwasaki et al.

(10) Patent No.: US 11,380,352 B2
(45) Date of Patent: Jul. 5, 2022

(54) MAGNETIC HEAD INCLUDING STACKED BODY WITH CHANGING ELECTRICAL RESISTANCE AND MAGNETIC RECORDING DEVICE INCLUDING SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Iwasaki, Tokyo (JP); Masayuki Takagishi, Tokyo (JP); Naoyuki Narita, Funabashi Chiba (JP); Tazumi Nagasawa, Yokohama Kanagawa (JP); Hirofumi Suto, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/015,688

(22) Filed: Sep. 9, 2020

(65) Prior Publication Data
US 2021/0104257 A1    Apr. 8, 2021

(30) Foreign Application Priority Data
Oct. 3, 2019  (JP) .............................. JP2019-182718

(51) Int. Cl.
*G11B 5/235*  (2006.01)
*G11B 5/127*  (2006.01)
(Continued)

(52) U.S. Cl.
CPC ............... *G11B 5/235* (2013.01); *G11B 5/02* (2013.01); *G11B 5/1278* (2013.01); *G11B 5/314* (2013.01);
(Continued)

(58) Field of Classification Search
None
See application file for complete search history.

(56) References Cited

U.S. PATENT DOCUMENTS 10,950,258 B1 *  3/2021  Gao et al. ............ G11B 5/3146
2013/0314820 A1  11/2013  Shimizu et al.
(Continued)

FOREIGN PATENT DOCUMENTS

| JP | 2013-246852 A | 12/2013 |
| JP | 2014-130672 A | 7/2014 |
| JP | 2019-57337 A | 4/2019 |

*Primary Examiner* — Craig A. Renner
(74) *Attorney, Agent, or Firm* — Finnegan, Henderson, Farabow, Garrett & Dunner L.L.P.

(57) ABSTRACT

According to one embodiment, a magnetic recording device includes a magnetic head, and an electrical circuit. The magnetic head includes a magnetic pole, a first shield, and a stacked body provided between the magnetic pole and the first shield. The stacked body includes a first magnetic layer, a second magnetic layer, a first layer provided between the first and second magnetic layers, and a first nonmagnetic layer provided between the first magnetic layer and the first layer. A change rate of an electrical resistance of the stacked body with respect to a change of a current density flowing in the stacked body has a first value when the current density is in a first range, a second value when the current density is in a second range, and a third value when the current density is in a third range.

19 Claims, 14 Drawing Sheets

(51) Int. Cl.
*G11B 5/02* (2006.01)
*G11B 5/31* (2006.01)
*G11B 5/11* (2006.01)
*G11B 5/00* (2006.01)

(52) U.S. Cl.
CPC .............. *G11B 5/3146* (2013.01); *G11B 5/11* (2013.01); *G11B 2005/0024* (2013.01)

(56) References Cited

U.S. PATENT DOCUMENTS

2014/0146420 A1    5/2014   Shimizu et al.
2019/0088274 A1    3/2019   Narita et al.

\* cited by examiner

| | t21 | t25 | Lg | G |
|---|---|---|---|---|
| sp1 | 1nm | 0.5nm | 17.3nm | -0.2 |
| sp2 | 2nm | 0.5nm | 18.3nm | 0.2 |
| sp3 | 4nm | 0.5nm | 20.3nm | 1 |
| sp4 | 4nm | 0.2nm | 20.3nm | 0.8 |
| sp5 | 4nm | 1nm | 20.3nm | 0.5 |
| sp6 | 6nm | 0.5nm | 22.3nm | 0.8 |
| sp7 | 8nm | 0.5nm | 24.4nm | -0.1 |
| sp8 | 2nm | 0nm | 17.8nm | -0.3 |
| sp9 | 2nm | 3nm | 20.8nm | -0.5 |

MAGNETIC HEAD INCLUDING STACKED BODY WITH CHANGING ELECTRICAL RESISTANCE AND MAGNETIC RECORDING DEVICE INCLUDING SAME

CROSS-REFERENCE TO RELATED APPLICATIONS

This application is based upon and claims the benefit of priority from Japanese Patent Application No. 2019-182718, filed on Oct. 3, 2019; the entire contents of which are incorporated herein by reference.

FIELD

An embodiment of the invention generally relates to a magnetic head and a magnetic recording device.

BACKGROUND

Information is recorded in a magnetic storage medium such as a HDD (Hard Disk Drive) or the like by using a magnetic head. It is desirable to increase the recording density of the magnetic head and the magnetic recording device.

DETAILED DESCRIPTION

Figure 1A:
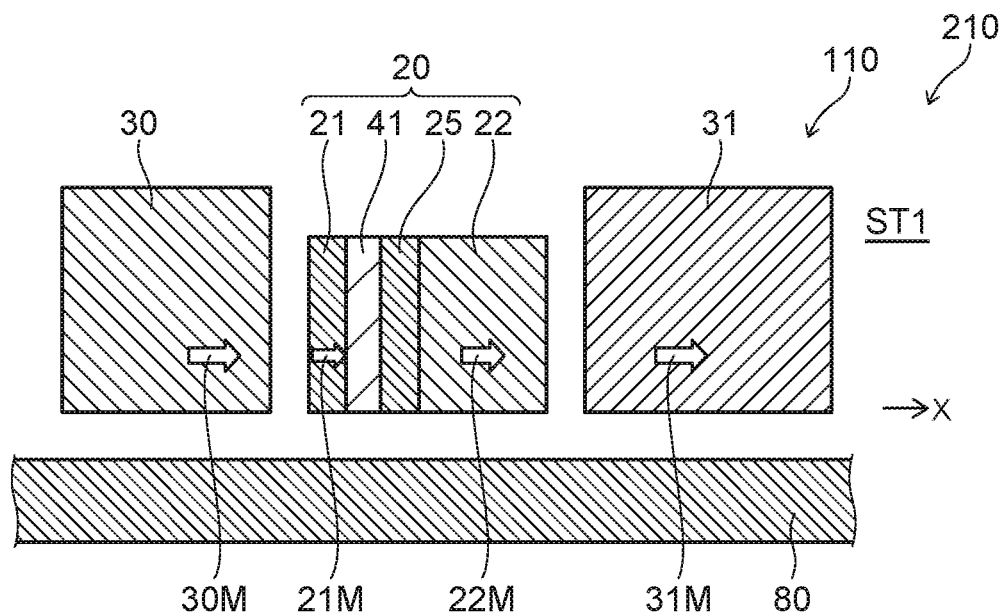
FIG. 1A and FIG. 1B are schematic cross-sectional views illustrating a magnetic recording device according to a first embodiment.

According to one embodiment, a magnetic recording device includes a magnetic head, and an electrical circuit. The magnetic head includes a magnetic pole, a first shield, and a stacked body provided between the magnetic pole and the first shield. The stacked body includes a first magnetic layer, a second magnetic layer, a first layer provided between the first magnetic layer and the second magnetic layer, and a first nonmagnetic layer provided between the first magnetic layer and the first layer. The first layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. A change rate of an electrical resistance of the stacked body with respect to a change of a current density flowing in the stacked body has a first value when the current density is in a first range, a second value when the current density is in a second range, and a third value when the current density is in a third range. The second range is between the first range and the third range. The second value is greater than the first value and greater than the third value. The electrical circuit supplies, to the stacked body, a current of a current density within the third range.

According to one embodiment, a magnetic head includes a magnetic pole, a first shield, and a stacked body provided between the magnetic pole and the first shield. The stacked body includes a first magnetic layer, a second magnetic layer, a first layer provided between the first magnetic layer and the second magnetic layer, and a first nonmagnetic layer provided between the first magnetic layer and the first layer. The first layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. A change rate of an electrical resistance of the stacked body with respect to a change of a current density flowing in the stacked body has a first value when the current density is in a first range, a second value when the current density is in a second range, and a third value when the current density is in a third range. The second range is between the first range and the third range. The second value is greater than the first value and greater than the third value. A current of a current density within the third range is supplied to the stacked body.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
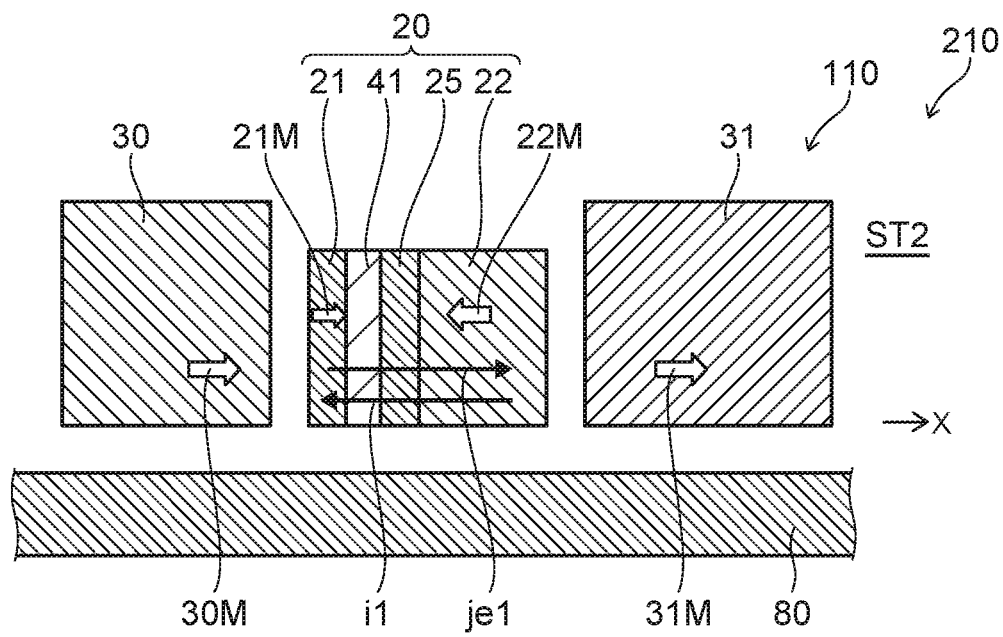

FIG. 1A and FIG. 1B are schematic cross-sectional views illustrating a magnetic recording device according to a first embodiment.

As shown in FIG. 1A, the magnetic recording device 210 according to the embodiment includes a magnetic head 110 and a magnetic recording medium 80. Information is recorded in the magnetic recording medium 80 by the magnetic head 110. The magnetic recording medium 80 is, for example, a perpendicular recording medium. Examples of the magnetic recording medium 80 are described below.

As shown in FIG. 1A, the magnetic head 110 includes a magnetic pole 30, a first shield 31, and a stacked body 20. The stacked body 20 is provided between the magnetic pole 30 and the first shield 31.

The stacked body 20 includes a first magnetic layer 21, a second magnetic layer 22, a first layer 25, and a first nonmagnetic layer 41. The first layer 25 is provided between the first magnetic layer 21 and the second magnetic layer 22. The first layer 25 includes, for example, at least one selected from the group (a first group) consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. The first nonmagnetic layer 41 is provided between the first magnetic layer 21 and the first layer 25.

The magnetic pole 30 is, for example, a major magnetic pole. For example, the magnetic pole 30 and the first shield 31 form a magnetic circuit. As described below, a coil is provided at the magnetic pole 30 (and/or the first shield 31). A recording magnetic field that corresponds to a recording current flowing in the coil is generated from the magnetic pole 30. At least a portion of the generated recording magnetic field is oriented toward the magnetic recording medium 80. At least a portion of the recording magnetic field is applied to the magnetic recording medium 80. The orientation of the magnetization of the portion of the magnetic recording medium 80 to which the recording magnetic field is applied is controlled by the recording magnetic field. Thereby, information that corresponds to the orientation of the recording magnetic field is recorded in the magnetic recording medium 80. For example, at least a portion of the recording magnetic field is oriented toward the first shield 31 after being oriented toward the magnetic recording medium 80.

The direction from the magnetic pole 30 toward the first shield 31 is taken as an X-axis direction. The X-axis direction is, for example, the down-track direction.

In the example, the second magnetic layer 22 is between the first magnetic layer 21 and the first shield 31. The first magnetic layer 21 is between the magnetic pole 30 and the first shield 31. The first nonmagnetic layer 41 is between the first magnetic layer 21 and the first shield 31. The first layer 25 is between the first nonmagnetic layer 41 and the first shield 31. The second magnetic layer 22 is between the first layer 25 and the first shield 31.

For example, the first layer 25 contacts the first nonmagnetic layer 41 and the second magnetic layer 22. For example, the first nonmagnetic layer 41 contacts the first magnetic layer 21 and the first layer 25.

A current can be supplied to the stacked body 20. For example, as described below, a current is supplied to the stacked body 20 via the magnetic pole 30 and the first shield 31. The current is supplied from an electrical circuit 20D described below (referring to FIG. 15).

FIG. 1A illustrates a first state ST1, and FIG. 1B illustrates a second state ST2. In the first state ST1, for example, a current is not supplied to the stacked body 20. The first state ST1 is, for example, an off-state. In the second state ST2, a current i1 is supplied to the stacked body 20. For example, the current i1 is a current that is sufficient to reverse a magnetization 22M of the second magnetic layer 22. In the second state ST2, an electron current je1 is supplied to the stacked body 20. In the example, the current i1 has an orientation from the first shield 31 toward the magnetic pole 30. In the example, the electron current je1 has an orientation from the magnetic pole 30 toward the first shield 31. For example, the current that is supplied to the stacked body 20 in the first state ST1 is less than the current i1 supplied to the stacked body 20 in the second state ST2.

In the example as shown in FIG. 1A, in the first state ST1, a magnetization 30M of the magnetic pole 30 and a magnetization 31M of the first shield 31 have orientations from the magnetic pole 30 toward the first shield 31. The orientation from the magnetic pole 30 toward the first shield 31 is taken as a first orientation. A magnetization 21M of the first magnetic layer 21 is along the first orientation. The magnetization 22M of the second magnetic layer 22 also is along the first orientation.

In the second state ST2 in which the current i1 (i.e., the electron current je1) is supplied, the magnetization 30M, the magnetization 31M, and the magnetization 21M are along the first orientation. The magnetization 22M is along the orientation from the first shield 31 toward the magnetic pole 30 (a second orientation). Thus, in the second state ST2, the magnetization 22M is reversed from the orientation of the first state ST1.

In the second state ST2, the magnetization 22M of the second magnetic layer 22 has a component having the reverse orientation of the magnetization 30M of the magnetic pole 30 and the orientation of the magnetization 31M of the first shield 31. Thereby, the recording magnetic field that is generated from the magnetic pole 30 does not easily pass through the second magnetic layer 22 (i.e., the stacked body 20). Thereby, much of the recording magnetic field generated from the magnetic pole 30 is easily oriented toward the magnetic recording medium 80. The recording magnetic field is efficiently applied to the magnetic recording medium 80.

For example, when the distance between the magnetic pole 30 and the first shield 31 is reduced to increase the recording density, the recording magnetic field that is generated from the magnetic pole 30 easily enters the first shield 31 without being oriented toward the magnetic recording medium 80. At this time, in the embodiment, the recording magnetic field is effectively oriented toward the magnetic recording medium 80 even when the distance between the magnetic pole 30 and the first shield 31 is short because the magnetization 22M of the second magnetic layer 22 is reversed. The recording magnetic field can be effectively applied to the magnetic recording medium 80 even when the distance between the magnetic pole 30 and the first shield 31 is short. Thereby, a magnetic head and a magnetic recording device can be provided in which the recording density can be increased.

In FIG. 1A and FIG. 1B, the magnetization 30M of the magnetic pole 30 and the magnetization 31M of the first shield 31 have the first orientation from the magnetic pole 30 toward the first shield 31. In the embodiment, the magnetization 30M of the magnetic pole 30 and the magnetization 31M of the first shield 31 may have the second orientation from the first shield 31 toward the magnetic pole 30. In such a case, the magnetization 21M of the first magnetic layer 21 has the second orientation. In the second state ST2, the magnetization 22M of the second magnetic layer 22 is reversed and has the first orientation from the magnetic pole 30 toward the first shield 31. In such a case as well, similarly to the description recited above, the recording magnetic field from the magnetic pole 30 is easily oriented toward the magnetic recording medium 80. Thereby, the recording magnetic field is efficiently applied to the magnetic recording medium 80.

In the embodiment, for example, the stacked body 20 does not generate an alternating-current magnetic field. Or, the frequency of the alternating-current magnetic field generated from the stacked body 20 is greater than the magnetic resonant frequency of the magnetic recording medium.

On the other hand, there is a reference example of MAMR (Microwave Assisted Magnetic Recording). In the reference example, a high frequency magnetic field is generated from a stacked body including a magnetic layer. The high frequency magnetic field is applied to a portion of the magnetic recording medium 80; magnetic resonance is generated in the portion of the magnetic recording medium 80; and the orientation of the magnetization of the magnetic recording medium 80 changes easily. In the reference example, the frequency of the high frequency magnetic field generated from the stacked body is not more than the magnetic resonant frequency of the magnetic recording medium 80. Thereby, the orientation of the magnetization of the magnetic recording medium 80 changes easily due to the generation of the magnetic resonance.

Conversely, in the embodiment, the stacked body 20 does not generate an alternating-current magnetic field. Or, the frequency of the alternating-current magnetic field generated from the stacked body 20 is greater than the magnetic resonant frequency of the magnetic recording medium. An operation that is different from MAMR is performed in the embodiment.

In the embodiment, the first layer 25 is provided between the first nonmagnetic layer 41 and the second magnetic layer 22. The first layer 25 includes an element of the first group recited above. When the electron current je1 flows in the first orientation from the magnetic pole 30 toward the first shield 31, the reflection spin torque transfer decreases at such a first layer 25. The effects of the reflection spin torque transfer on the magnetization 21M of the first magnetic layer 21 are suppressed thereby. The orientation of the magnetization 21M of the first magnetic layer 21 is stable thereby. The effects on the transmission spin torque transfer due to the first layer 25 are small, and the transmission spin torque transfer efficiently acts on the second magnetic layer 22. The magnetization 22M of the second magnetic layer 22 can be efficiently reversed thereby. A magnetic head and a magnetic recording device can be provided in which the recording density can be increased.

In the embodiment, the first nonmagnetic layer 41 and the first layer 25 are provided between the first magnetic layer 21 and the second magnetic layer 22. The first nonmagnetic layer 41 includes at least one selected from the group consisting of Cr, Cu, Ag, and Au. The material of the first nonmagnetic layer 41 is different from the material of the first layer 25. Thus, an asymmetric interface region is provided between the first magnetic layer 21 and the second magnetic layer 22. In such a case, the spin-transfer torque is asymmetrically transferred.

An example of a characteristic of the magnetic head according to the embodiment will now be described.

Figure 2:
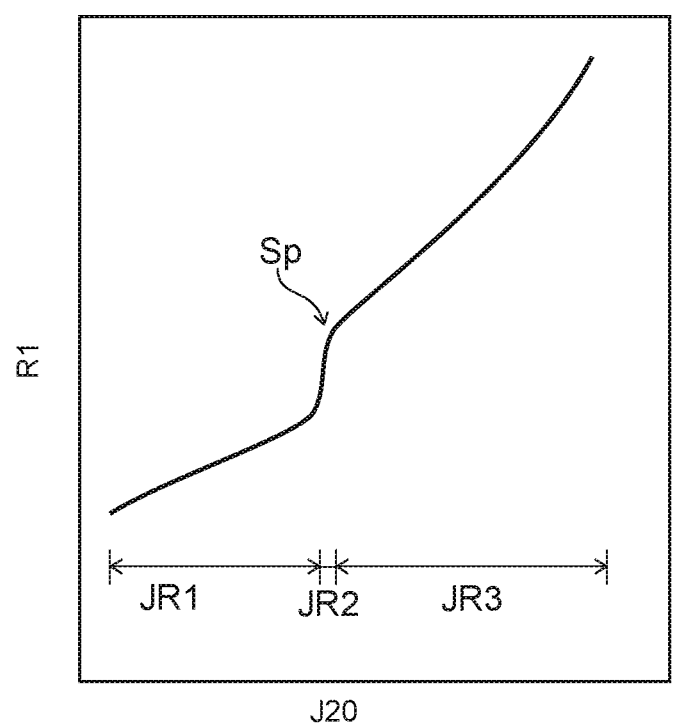
FIG. 2 is a graph illustrating a characteristic of the magnetic head according to the embodiment.

FIG. 2 is a graph illustrating a characteristic of the magnetic head according to the embodiment.

The horizontal axis of FIG. 2 is a current density J20 flowing in the stacked body 20. The vertical axis of FIG. 2 is an electrical resistance R1 (a direct current resistance) relating to the stacked body 20. In the example, the electrical resistance R1 includes both the electrical resistance of the magnetic pole 30 and the electrical resistance of the first shield 31.

As shown in FIG. 2, the electrical resistance R1 increases as the current density J20 increases. The change of the electrical resistance R1 with respect to the change of the current density J20 includes a step-like change Sp and a parabolic configuration change caused by heat generation. It is considered that the step-like change Sp corresponds to the change of the orientation of the magnetization 22M of the second magnetic layer 22.

As shown in FIG. 2, the change rate of the electrical resistance R1 of the stacked body 20 with respect to the change of the current density J20 flowing in the stacked body 20 is not constant. The change rate has an abrupt change at the position of the step-like change Sp. As shown in FIG. 2, the change rate has a first value when the current density J20 is in a first range JR1. The change rate has a second value when the current density J20 is in a second range JR2. The change rate has a third value when the current density J20 is in a third range JR3. The second range JR2 is between the first range JR1 and the third range JR3. The second value of the change rate is greater than the first value of the change rate. The second value of the change rate is greater than the third value of the change rate. Thus, a range (the second range JR2) having a high change rate is between two ranges (the first range JR1 and the third range JR3) having low change rates. The step-like change Sp is generated in a range (the second range JR2) having a high change rate.

The first range JR1 corresponds to the first state ST1 illustrated in FIG. 1A. For example, the third range JR3 corresponds to the second state ST2 illustrated in FIG. 1B. It is considered that the magnetization 22M of the second magnetic layer 22 reverses when the current density J20 is in the second range JR2.

For example, when the current density J20 is in the first range JR1, the magnetization 22M of the second magnetic layer 22 has a component in the orientation of the magnetization 30M of the magnetic pole 30. For example, when the current density 320 is in the third range JR3, the magnetization 22M of the second magnetic layer 22 is reversed and has a component having the reverse orientation of the magnetization 30M of the magnetic pole 30.

The electrical circuit 20D (referring to FIG. 15) supplies, to the stacked body 20, the current i1 having the current density J20 within the third range JR3. Thereby, the magnetization 22M of the second magnetic layer 22 has a component having the reverse orientation of the magnetization 30M of the magnetic pole 30. Thereby, the recording magnetic field from the magnetic pole 30 is easily oriented toward the magnetic recording medium 80. Thereby, the recording magnetic field is efficiently applied to the magnetic recording medium 80. A magnetic head and a magnetic recording device can be provided in which the recording density can be increased.

An example of an evaluation result of the magnetic head according to the embodiment will now be described.

Figure 3:
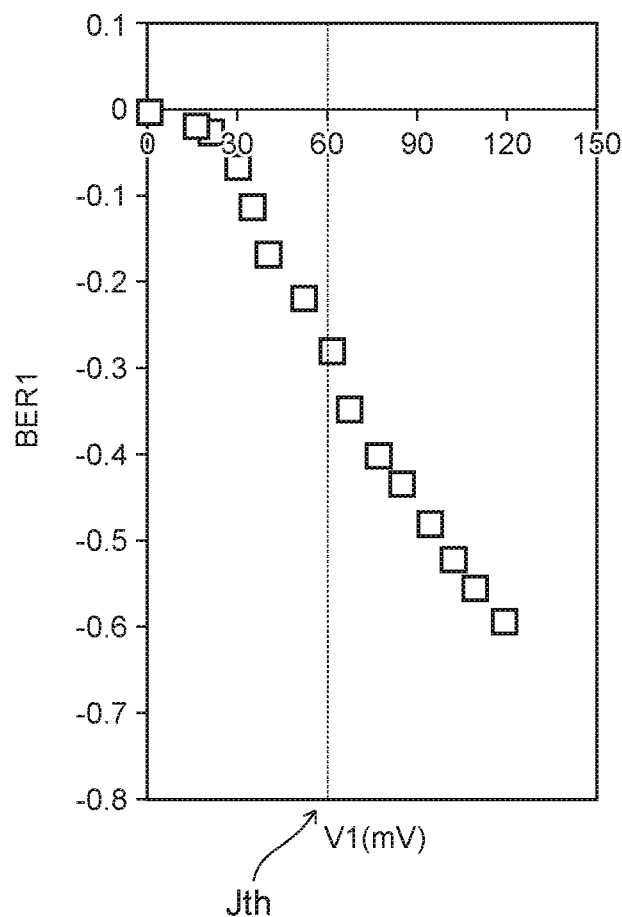
FIG. 3 is a graph illustrating a characteristic of the magnetic head.

FIG. 3 is a graph illustrating a characteristic of the magnetic head.

FIG. 3 illustrates a measurement result of the recording characteristic to the magnetic recording medium 80 by the magnetic head according to the embodiment. The horizontal axis of FIG. 3 is an applied voltage V1 (mV) that is applied to the stacked body 20. The level of the applied voltage V1 corresponds to the level of the current density J20. In the example, an applied voltage V1 of 100 mV corresponds to a current density J20 of $4 \times 10^8$ A/cm². The vertical axis of FIG. 3 is a change amount BER1 of the bit error rate (BER).

As shown in FIG. 3, the change amount BER1 of the bit error rate (BER) decreases as the applied voltage V1 increases. A low bit error rate (BER) is obtained according to the embodiment.

Figure 4:
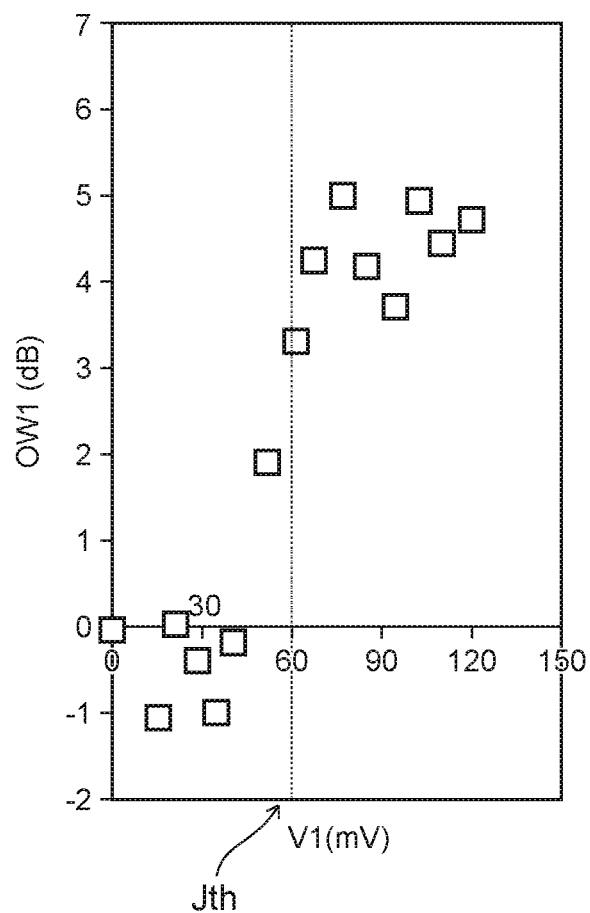
FIG. 4 is a graph illustrating a characteristic of the magnetic head.

FIG. 4 is a graph illustrating a characteristic of the magnetic head.

The horizontal axis of FIG. 4 is the applied voltage V1 (mV) that is applied to the stacked body 20. The vertical axis of FIG. 4 is a change amount OW1 (dB) of a parameter OW relating to the overwrite characteristic. The parameter OW relates to an overwrite characteristic that can be considered to be static compared to the nanosecond region. The parameter OW corresponds to the attenuation characteristic of a high frequency pattern signal when a high frequency recording pattern is erased using a low frequency magnetic field. A large change amount OW1 of the parameter OW corresponds to a good overwrite characteristic.

As shown in FIG. 4, the change amount OW1 of the parameter OW increases as the applied voltage V1 increases and the current density J20 flowing in the stacked body 20 increases. The change amount OW1 of the parameter OW abruptly increases when the applied voltage V1 is about 55 mV. The increase of the change amount OW1 of the parameter OW saturates when the applied voltage V1 reaches or exceeds 60 mV.

Figure 5:
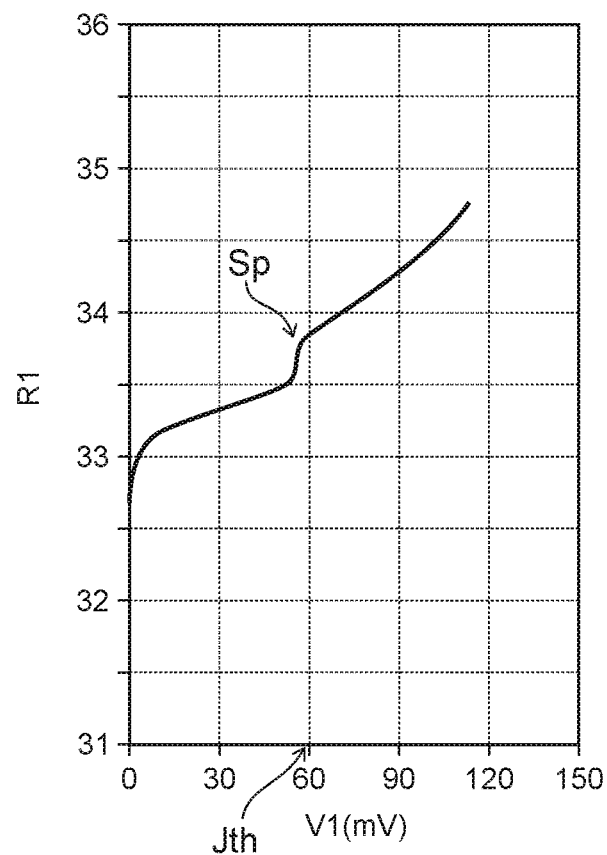
FIG. 5 is a graph illustrating a characteristic of the magnetic head.

FIG. 5 is a graph illustrating a characteristic of the magnetic head.

The horizontal axis of FIG. 5 is the applied voltage V1 (mV) that is applied to the stacked body 20. The vertical axis of FIG. 5 is the electrical resistance R1 (the direct current resistance (arbitrary units)) relating to the stacked body 20. In the example, the electrical resistance R1 includes both the resistance of the magnetic pole 30 and the resistance of the first shield 31.

As shown in FIG. 5, the electrical resistance R1 increases as the applied voltage V1 increases. The change of the electrical resistance R1 with respect to the change of the applied voltage V1 includes the step-like change Sp and a parabolic configuration change caused by heat generation. The step-like change Sp occurs at the vicinity of a threshold Jth of the current density. The value of the applied voltage V1 corresponding to the threshold Jth of the current density is about 55 mV.

From FIG. 4 and FIG. 5, it can be seen that the change amount OW1 of the parameter OW relating to the overwrite characteristic occurs at the applied voltage V1 (i.e., the threshold Jth of the current density) at which the electrical resistance R1 has the step-like change Sp.

On the other hand, as described above with reference to FIG. 3, the bit error rate (BER) decreases as the applied voltage V1 (i.e., the current density) increases. The bit error rate (BER) continues to decrease even when the applied voltage V1 is 60 mV or more. In the embodiment, the bit error rate (BER) continues to decrease even in the region (the region of the current density) where the applied voltage V1 is not less than 60 mV and the change amount OW1 of the parameter OW relating to the overwrite characteristic is saturated.

On the other hand, in MAMR, the current density dependence of the bit error rate (BER) has a behavior interrelated with the current density dependence of the change amount OW1 of the parameter OW relating to the overwrite characteristic.

Thus, in the embodiment, the bit error rate (BER) continues to improve as the current density increases, even when the improvement of the change amount OW1 of the parameter OW relating to the overwrite characteristic is saturated. In the embodiment, the bit error rate (BER) improves as the current density increases until the magnetization 22M of the second magnetic layer 22 is saturated at the reverse orientation of the magnetization 30M of the magnetic pole 30.

In the embodiment, for example, in the second state ST2 in which the current i1 is supplied to the stacked body 20, the current density J20 is set so that the magnetization 22M of the second magnetic layer 22 is reversed with respect to the magnetization 30M of the magnetic pole 30 and the magnetization 31M of the first shield 31. In the second state ST2 of the embodiment, the current density J20 is set so that an angle θm of the magnetization 22M of the second magnetic layer 22 is greater than 90 degrees.

For example, in the second state ST2, the magnetization 22M of the second magnetic layer 22 reverses, and the X-axis direction component of the magnetization 22M has a reverse component of the magnetization 30M of the magnetic pole 30. The recording magnetic field is increased thereby. In the embodiment, the angle θm between the magnetization 30M of the magnetic pole 30 and the magnetization 22M of the second magnetic layer 22 is greater than 90 degrees. In MAMR, the angle θm that is used is 90 degrees or less. Compared to MAMR, the oscillation frequency is high in the embodiment. In MAMR, the frequency of the stacked body 20 is set to be less than the medium resonant frequency. Therefore, in MAMR, the angle θm is set to 90 degrees.

In the embodiment, it is favorable for the thickness of the first magnetic layer 21 to be not less than 1 nm and not more than 8 nm. For example, it is favorable for the thickness of the first magnetic layer 21 to be not less than 1.5 nm and not more than 8 nm. According to investigations by the inventor, by using the first layer 25 recited above when the thickness of the first magnetic layer 21 is thin (e.g., greater than 1 nm and not more than 8 nm), the orientation of the magnetization 22M of the second magnetic layer 22 changes more easily, and the magnetization 22M can be efficiently reversed.

For example, an asymmetric interface region is provided between the first magnetic layer 21 and the second magnetic layer 22, and the spin-transfer torque is asymmetrically transferred. In such a case, it is considered that the magnetization 22M of the second magnetic layer 22 changes easily even when the first magnetic layer 21 is thin.

On the other hand, when the first layer 25 is not provided, the region between the first magnetic layer 21 and the second magnetic layer 22 is symmetric. In such a case, it is considered that the magnetization of a thin magnetic layer (e.g., the first magnetic layer 21) changes easily. In such a case, it is considered that the magnetization of a thick magnetic layer (e.g., the second magnetic layer 22) does not easily change and does not easily reverse.

Figures 6, 7:
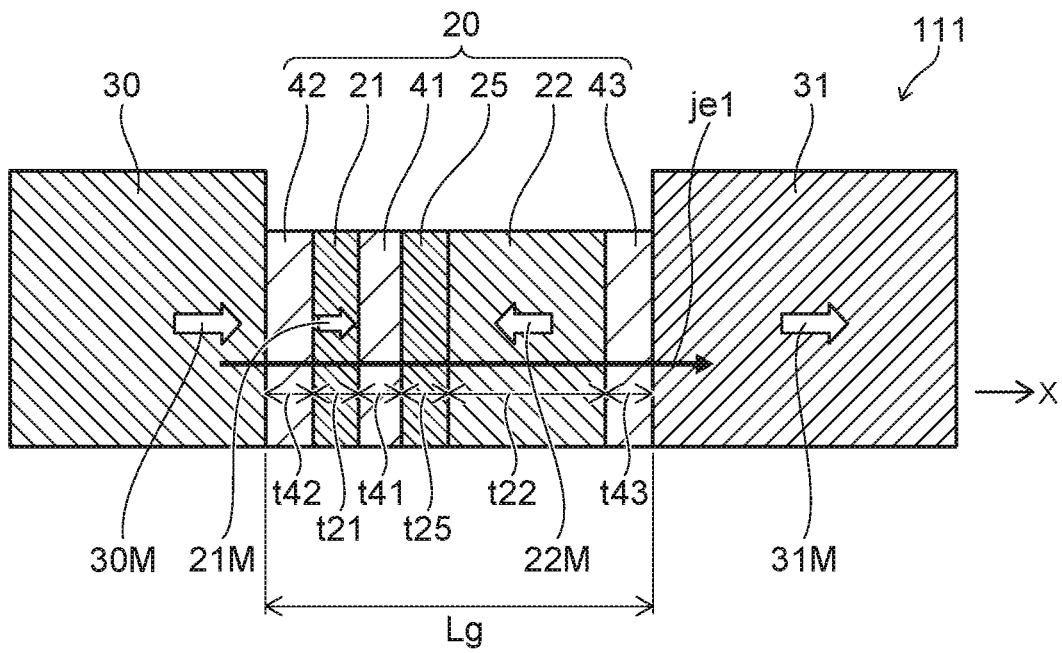
FIG. 6 is a schematic cross-sectional view illustrating the magnetic recording device according to the first embodiment.
FIG. 7 is a table illustrating the characteristics of the magnetic recording device.

FIG. 6 is a schematic cross-sectional view illustrating the magnetic recording device according to the first embodiment.

The magnetic recording medium 80 is not illustrated in FIG. 6. As shown in FIG. 6, a magnetic head 111 according to the embodiment includes the magnetic pole 30, the first shield 31, and the stacked body 20. The stacked body 20 includes a second nonmagnetic layer 42 and a third nonmagnetic layer 43 in addition to the first magnetic layer 21, the second magnetic layer 22, the first layer 25, and the first nonmagnetic layer 41.

The first magnetic layer 21 is between the second nonmagnetic layer 42 and the first nonmagnetic layer 41. For example, the second nonmagnetic layer 42 includes at least one selected from the group consisting of Ta, Cr, and Cu. The second nonmagnetic layer 42 may be a film including multiple stacked elements (e.g., Ta/Cr, Ta/Ru, Ta/Cu, etc.). The second magnetic layer 22 is between the first layer 25 and the third nonmagnetic layer 43. The third nonmagnetic layer 43 includes at least one selected from the group consisting of Cr, Cu, Ag, and Au.

For example, the second nonmagnetic layer 42 may function as a foundation layer. The third nonmagnetic layer 43 may function as a capping layer.

In the magnetic head 111 as well, the current density J20 is set so that the magnetization 22M of the second magnetic layer 22 is reversed with respect to the magnetization 30M of the magnetic pole 30 and the magnetization 31M of the first shield 31 in the second state ST2. The current density J20 is set so that the angle θm is greater than 90 degrees.

As shown in FIG. 6, the first magnetic layer 21 has a thickness t21. The second magnetic layer 22 has a thickness t22. The first layer 25 has a thickness t25. The first nonmagnetic layer 41 has a thickness t41. The second nonmagnetic layer 42 has a thickness t42. These thicknesses are lengths along the X-axis direction. These thicknesses are lengths along the direction from the magnetic pole 30 toward the first shield 31.

A distance Lg between the magnetic pole 30 and the first shield 31 is a length along the X-axis direction. The distance Lg corresponds to the recording gap. In the example, the distance Lg corresponds to the sum of the thickness t42, the thickness t21, the thickness t41, the thickness t25, the thickness t22, and a thickness t43.

An example of results of measuring the magnetic recording characteristic for the configuration of the magnetic head 111 when the thickness t21 of the first magnetic layer 21 is changed will now be described. The samples of the measurement had the following configurations. The second nonmagnetic layer 42 was a stacked film including a Ta layer and a Ru layer. The thickness t42 of the second nonmagnetic layer 42 was 3 nm. The first magnetic layer 21 was an FeCr layer. The concentration of Fe in the FeCr layer was 30 at % (atomic percent). The thickness t21 of the first magnetic layer 21 was modified in the range of 1 nm to 8 nm. The first nonmagnetic layer 41 was a Cu layer. The thickness t41 of the first nonmagnetic layer 41 was 2 nm. The first layer 25 was a Ta layer. The thickness t25 of the first layer 25 was 0 nm, 0.2 nm, 0.5 nm, 1 nm, or 3 nm. A thickness t25 of 0 nm corresponds to the first layer 25 not being provided. The second magnetic layer 22 included six FeCo layers having thicknesses of 1.6 nm, and Ni layers having thicknesses of 0.2 nm provided respectively each between the FeCo layers. The thickness t22 of the second magnetic layer 22 was 8.8 nm. The third nonmagnetic layer 43 was a Cu layer. The thickness t43 of the third nonmagnetic layer 43 was 2 nm.

FIG. 7 is a table illustrating the characteristics of the magnetic recording device.

FIG. 7 shows the measurement results of samples sp1 to sp9. FIG. 7 shows the thickness t21, the thickness t25, the distance Lg, and a gain G of the bit error rate (BER) of these configurations. The gain G of the BER is defined as the increase or decrease (dB) referenced to the bit error rate (BER) for the magnetic head in which the stacked body 20 is not provided and the distance Lg is 18 nm. The current density J20 of the current flowing in the stacked body 20 was $5 \times 10^8$ A/cm$^2$. Good recording with few errors is obtained when the gain G is positive and the absolute value of the gain G is large.

As shown in FIG. 7, the thickness t21 of the first magnetic layer 21 was 2 nm to 6 nm for the samples sp2 to sp6. The SNR gain G was positive, and good recording is possible for the samples sp2 to sp6. In the sample sp1, the thickness t21 was 1 nm. In the sample sp1, the SNR gain G was negative. In the sample sp7, the thickness t21 was 8 nm. In the sample sp7, the SNR gain G was negative.

In the sample sp8, the thickness t25 was 0 nm, and the first layer 25 was not provided. In the sample sp8, the SNR gain G was negative. In the sample sp9, the thickness t21 was 2 nm, and the thickness t25 was 3 nm. In the sample sp9, the SNR gain G was negative.

From the results of FIG. 7, for example, it is favorable for the thickness t21 of the first magnetic layer 21 to be greater than 1 nm but less than 8 nm. For example, it is favorable for the thickness t21 of the first magnetic layer 21 to be not less than 1.5 nm but less than 8 nm. A positive SNR gain G is easily obtained. For example, the thickness t21 may be not less than 1.5 nm and not more than 6 nm. In the example of FIG. 7, the first nonmagnetic layer 41 included Cu. As another example, the gain G was +0.3 when the first nonmagnetic layer 41 included Cr in the configuration of the sample sp1. When the first nonmagnetic layer 41 includes Cr, a positive gain G is obtained even when a thinner first magnetic layer 21 is used.

For example, it is favorable for the thickness t25 of the first layer 25 to be not less than 0.5 nm but less than 3 nm. A positive SNR gain G is easily obtained thereby. For example, the thickness t25 may be not less than 0.5 nm and not more than 1 nm.

In the embodiment, for example, it is favorable for the thickness t41 of the first nonmagnetic layer 41 to be not less than 1 nm and not more than 4 nm. For example, when the thickness t41 is less than 1 nm, the magnetic coupling between the first magnetic layer 21 and the second magnetic layer 22 is strong, and the magnetization 22M of the second magnetic layer 22 does not reverse easily. When the thickness t41 is greater than 4 nm, for example, it is difficult to make the gap (the distance Lg) narrow.

In the embodiment, for example, it is favorable for the thickness t22 of the second magnetic layer 22 to be not less than 3 nm and not more than 9 nm. For example, a sufficient gain G is difficult to obtain when the thickness t22 is less than 3 nm. When the thickness t22 is greater than 9 nm, for example, magnetic domains occur easily inside the second magnetic layer 22.

In the embodiment, for example, it is favorable for the thickness t42 of the second nonmagnetic layer 42 to be not less than 2 nm and not more than 5 nm. For example, when the thickness t42 is less than 2 nm, a continuous second nonmagnetic layer 42 is difficult to obtain, and the foundation effect is difficult to obtain. When the thickness t42 is greater than 5 nm, it is difficult to make the gap (the distance Lg) narrow.

In the embodiment, for example, it is favorable for the thickness t43 of the third nonmagnetic layer 43 to be not less than 1 nm and not more than 4 nm. For example, when the thickness t43 is less than 1 nm, the magnetic coupling between the second magnetic layer 22 and the shield 31 is strong, and the magnetization 22M of the second magnetic layer 22 does not reverse easily. When the thickness t43 is greater than 4 nm, it is difficult to make the gap (the distance Lg) narrow.

In the embodiment, the first magnetic layer 21 includes, for example, the following first and second elements. The first element includes at least one selected from the group consisting of Fe, Ni, and Co. The second element includes at least one selected from the group consisting of Cr, V, Mn, Ti, and Sc. The materials that include such elements have negative polarizations. For example, the first magnetic layer 21 may have a negative polarization. The first magnetic layer 21 may include an alloy including the first element recited above and the second element recited above. Such an alloy has a negative polarization.

When the first magnetic layer 21 has a negative polarization, for example, the transmission spin torque due to the first magnetic layer 21 and the reflection spin torque from the first shield 31 including a material having a positive polarization (an FeCo alloy, etc.) are added. The magnetization reversal of the second magnetic layer 22 is easier thereby.

In the magnetic heads 110 and 111, for example, it is favorable for the second magnetic layer 22 to include a ferromagnetic material having a positive polarization. The second magnetic layer 22 includes, for example, at least one selected from the group consisting of Co, Fe, and Ni. In the first magnetic layer 21 and the second magnetic layer 22, the concentration of at least one selected from the group consisting of Co, Fe, and Ni is 50 atomic % or more. For example, the second magnetic layer 22 includes at least one selected from the group consisting of an FeCo film, a NiFe film, and a CoFe/NiFe stacked body. The CoFe/NiFe stacked body includes multiple CoFe films, and NiFe films are provided between the multiple CoFe films. In the CoFe/NiFe stacked body, a high saturation magnetization Ms is easily obtained by adjusting the thickness of the CoFe film and the thickness of the NiFe film. A large magnetic field is easily generated thereby. For example, a perpendicular magnetic anisotropy is easily generated by adjusting the thickness of the CoFe film and the thickness of the NiFe film. The magnetization 22M of the second magnetic layer 22 reverses more easily thereby.

For example, the second magnetic layer 22 includes at least one selected from the group consisting of a first material layer, a second material layer, and a third material layer. The first material layer includes CoFe. The second material layer includes a first CoFe layer, a second CoFe layer, and a NiFe layer provided between the first CoFe layer and the second CoFe layer. The third material layer includes multiple CoFe layers, and a Ni layer provided between the multiple CoFe layers.

On the other hand, a positive transmission spin torque and a positive reflection spin torque are combined when a material having a positive polarization similar to the second magnetic layer 22 is used as the first magnetic layer 21. Therefore, the spin torque that is received by the second magnetic layer 22 is canceled, and the magnetization reversal of the second magnetic layer 22 is difficult. When a material having a positive polarization is used as the first magnetic layer 21, for example, it is favorable to provide a third magnetic layer such as that described below.

Figure 8:
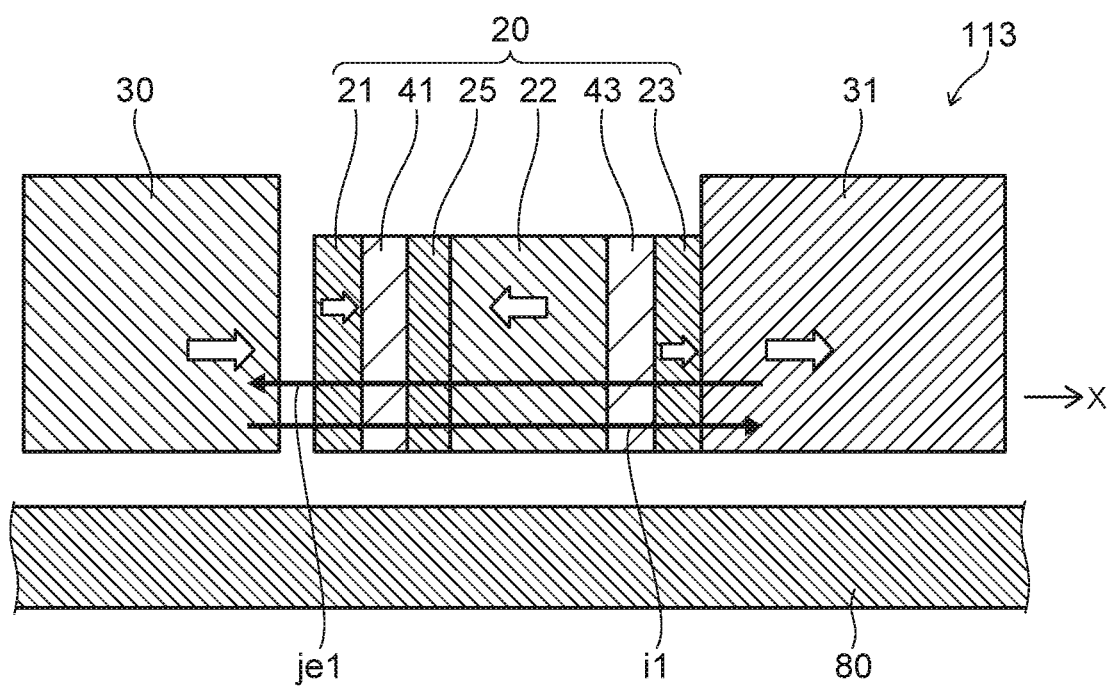
FIG. 8 is a schematic cross-sectional view illustrating a magnetic recording device according to the first embodiment.

FIG. 8 is a schematic cross-sectional view illustrating a magnetic recording device according to the first embodiment.

In the magnetic head 113 according to the embodiment as shown in FIG. 8, the stacked body 20 includes a third magnetic layer 23 and the third nonmagnetic layer 43 in addition to the first magnetic layer 21, the second magnetic layer 22, the first layer 25, and the first nonmagnetic layer 41.

The second magnetic layer 22 is between the first layer 25 and the third nonmagnetic layer 43. The third nonmagnetic layer includes at least one selected from the group consisting of Cr, Cu, Ag, and Au. For example, the thickness t43 of the third nonmagnetic layer 43 is not less than 1 nm and not more than 4 nm.

The third nonmagnetic layer 43 is between the second magnetic layer 22 and the third magnetic layer 23. For example, the third magnetic layer 23 is between the third nonmagnetic layer 43 and the first shield 31.

In the magnetic head 113, the third magnetic layer 23 includes a material having a negative polarization. For example, the third magnetic layer 23 includes the first and second elements recited above. In the magnetic head 113, the first magnetic layer 21 and the second magnetic layer 22 includes materials having positive polarizations.

In the magnetic head 113 as shown in FIG. 8, the electron current je1 that has an orientation from the first shield 31 toward the magnetic pole 30 flows. The current i1 that has an orientation from the magnetic pole 30 toward the first shield 31 flows. For example, a positive reflection spin torque transfer occurs in the first magnetic layer 21, and the spin acts on the second magnetic layer 22. A negative transmission spin torque transfer occurs in the third magnetic layer 23, and the spin acts on the second magnetic layer 22. The magnetization 22M of the second magnetic layer 22 reverses more efficiently due to the addition of the two spins. For the magnetic head 113 as well, a magnetic recording device can be provided in which the recording density can be increased.

In the magnetic head 113, the first magnetic layer 21 and the second magnetic layer 22 include ferromagnetic materials having positive polarizations. The first magnetic layer 21 and the second magnetic layer 22 include, for example, at least one selected from the group consisting of Co, Fe, and Ni. In the first magnetic layer 21 and the second magnetic layer 22, the concentrations of at least one selected from the group consisting of Co, Fe, and Ni are 50 atomic % or more. For example, the first magnetic layer 21 and the second magnetic layer 22 include at least one selected from the group consisting of an FeCo film, a NiFe film, and a CoFe/NiFe stacked body. The CoFe/NiFe stacked body includes multiple CoFe films, and NiFe films provided between the multiple CoFe films. A high saturation magnetization Ms is easily obtained in the CoFe/NiFe stacked body by adjusting the thickness of the CoFe film and the thickness of the NiFe film. A large magnetic field is easily generated thereby. For example, perpendicular magnetic anisotropy is easily generated by adjusting the thickness of the CoFe film and the thickness of the NiFe film. The magnetization 22M of the second magnetic layer 22 reverses more easily thereby. In the magnetic head 113, the first magnetic layer 21 and the second magnetic layer 22 include, for example, at least one selected from the group consisting of the first, second, and third material layers recited above.

Figure 9:
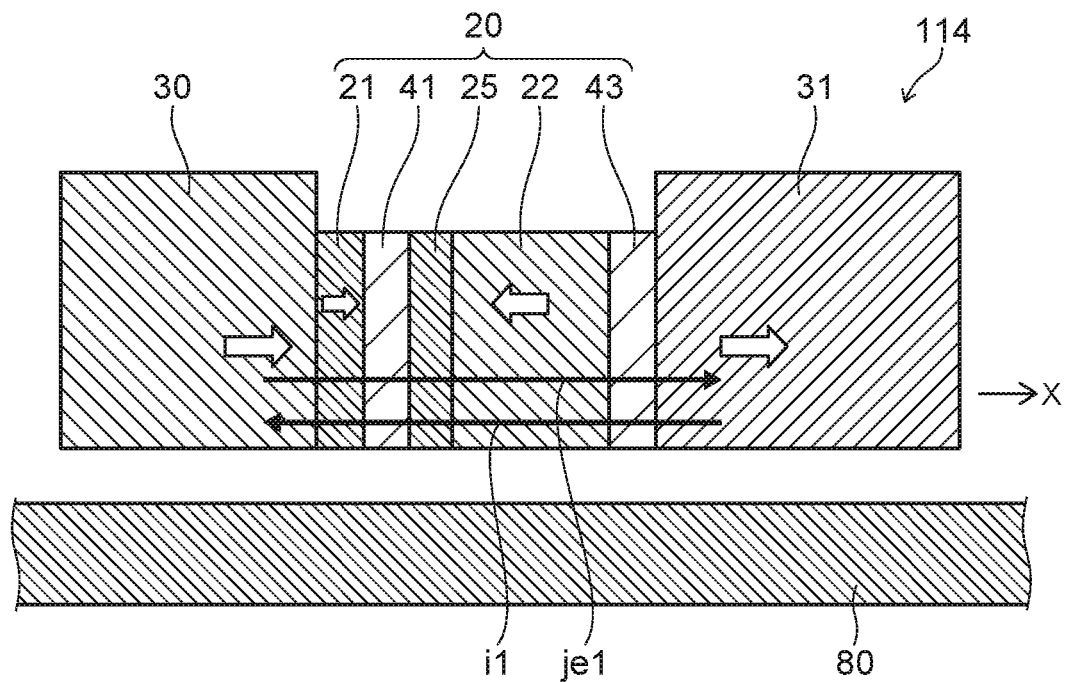
FIG. 9 is a schematic cross-sectional view illustrating a magnetic recording device according to the first embodiment.

FIG. 9 is a schematic cross-sectional view illustrating a magnetic recording device according to the first embodiment.

In the magnetic head 114 illustrated in FIG. 8, the first magnetic layer 21 contacts the magnetic pole 30. For example, the first magnetic layer 21 is magnetically coupled with the magnetic pole 30. Because the first magnetic layer 21 is magnetically coupled with the magnetic pole 30, the magnetization 21M of the first magnetic layer 21 is more stable. The magnetization 22M of the second magnetic layer 22 stably reverses more easily. For the magnetic head 114 as well, a magnetic recording device can be provided in which the recording density can be increased.

In the magnetic head 114, the stacked body 20 includes the third nonmagnetic layer 43. As described above, the second magnetic layer 22 is between the first layer 25 and the third nonmagnetic layer 43. The third nonmagnetic layer 43 includes at least one selected from the group consisting of Cr, Cu, Ag, and Au. The thickness of the third nonmagnetic layer 43 is not less than 1 nm and not more than 4 nm.

Figure 10:
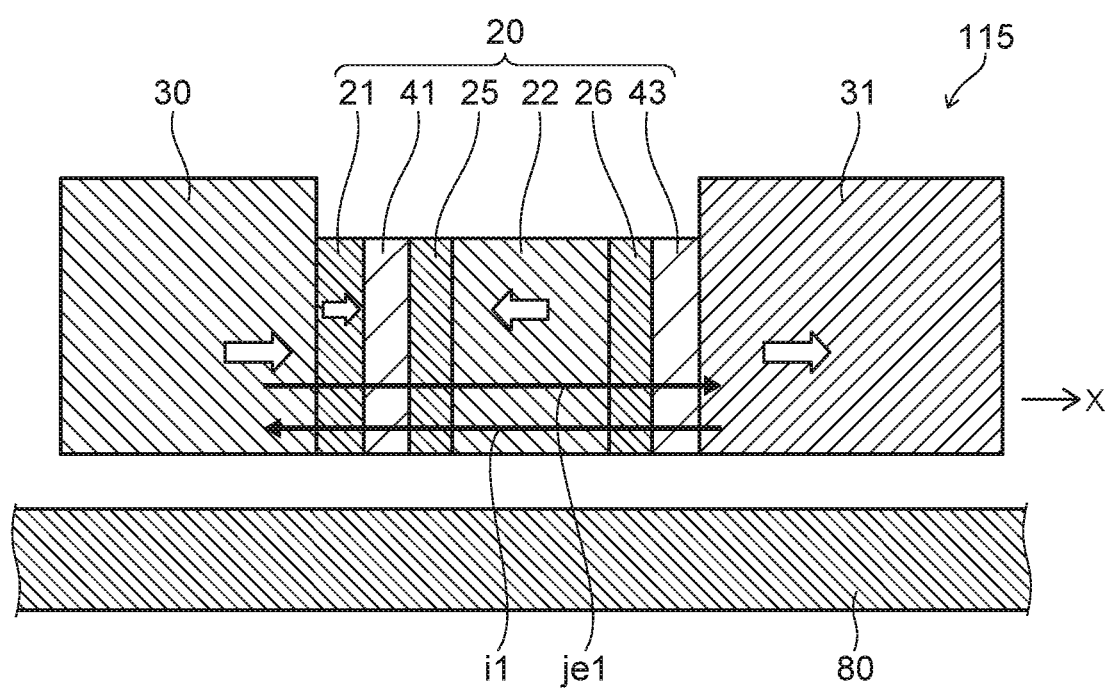
FIG. 10 is a schematic cross-sectional view illustrating a magnetic recording device according to the first embodiment.

FIG. 10 is a schematic cross-sectional view illustrating a magnetic recording device according to the first embodiment.

In a magnetic head 115 illustrated in FIG. 10, the stacked body 20 includes a second layer 26 and the third nonmagnetic layer 43 in addition to the first magnetic layer 21, the second magnetic layer 22, the first layer 25, and the first nonmagnetic layer 41. The second magnetic layer 22 is between the first layer 25 and the third nonmagnetic layer 43. The second layer 26 is between the second magnetic layer 22 and the third nonmagnetic layer 43. The second layer 26 includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu. The third nonmagnetic layer 43 includes, for example, at least one selected from the group consisting of Cr, Cu, Ag, and Au. The thickness of the third nonmagnetic layer 43 is, for example, not less than 1 nm and not more than 4 nm.

In the magnetic head 115, for example, the electron current je1 that has the orientation from the magnetic pole 30 toward the first shield 31 flows. For example, the current i1 that has the orientation from the first shield 31 toward the magnetic pole 30 flows. For example, the first magnetic layer 21 has a negative polarization.

In the magnetic head 115, a negative transmission spin torque transfer occurs in the first magnetic layer 21. A positive reflection spin torque transfer occurs in the first shield 31. These spins act on the second magnetic layer 22. In the magnetic head 115, the magnetization 22M of the second magnetic layer 22 reverses more efficiently.

In the magnetic head 115, the positive transmission spin-transfer torque from the second magnetic layer 22 to the shield 31 is attenuated by the second layer 26. For example, the spin-transfer torque from the shield 31 to the second magnetic layer 22 is maintained. The magnetization at the interface vicinity of the shield 31 contacting the third nonmagnetic layer 43 stabilizes thereby.

In the embodiment, the first shield 31 includes Co and Fe. For example, the first shield 31 may supply a positive reflection spin-transfer torque.

Examples of simulation results relating to the operation of the embodiment will now be described. The model of the simulation has the configuration of the magnetic head 110.

Figure 11A:
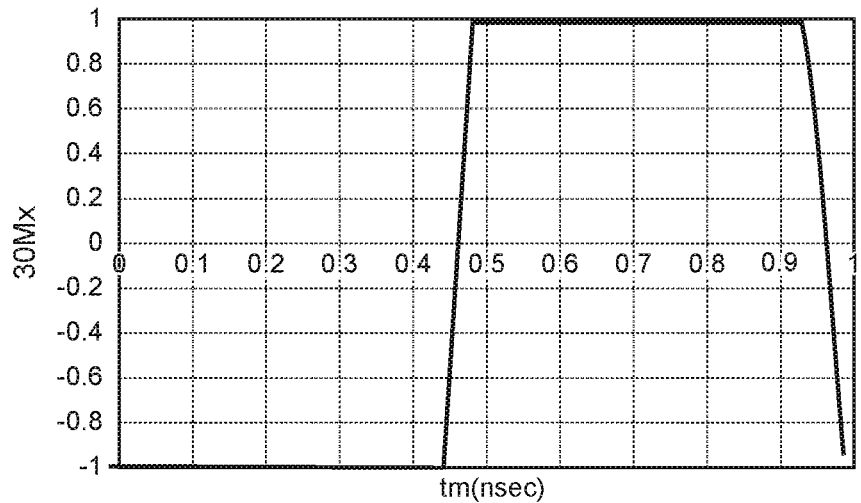
FIG. 11A to FIG. 11C are graphs illustrating characteristics of the magnetic head.
Figure 11B:
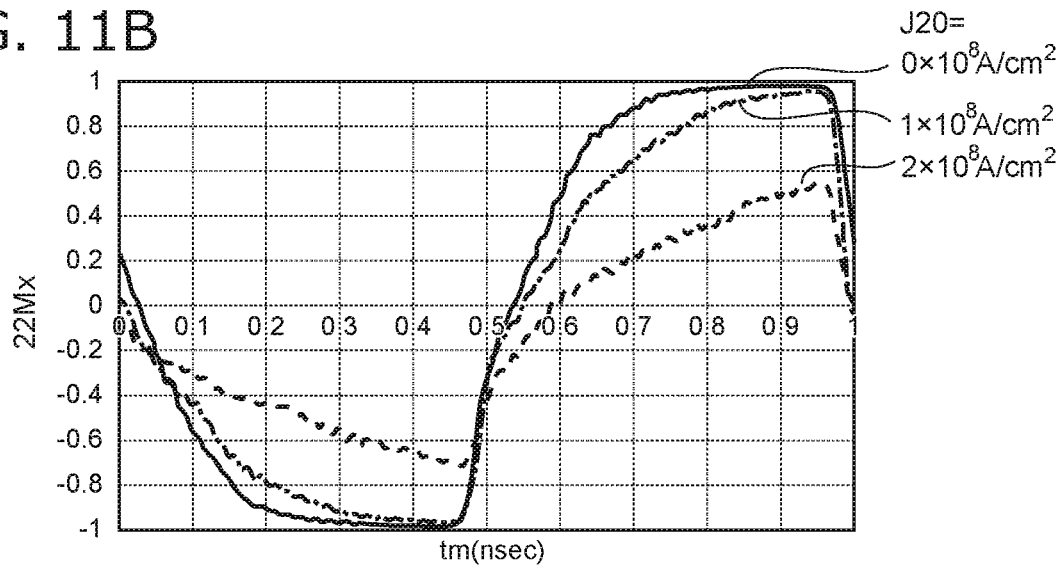
Figure 11C:
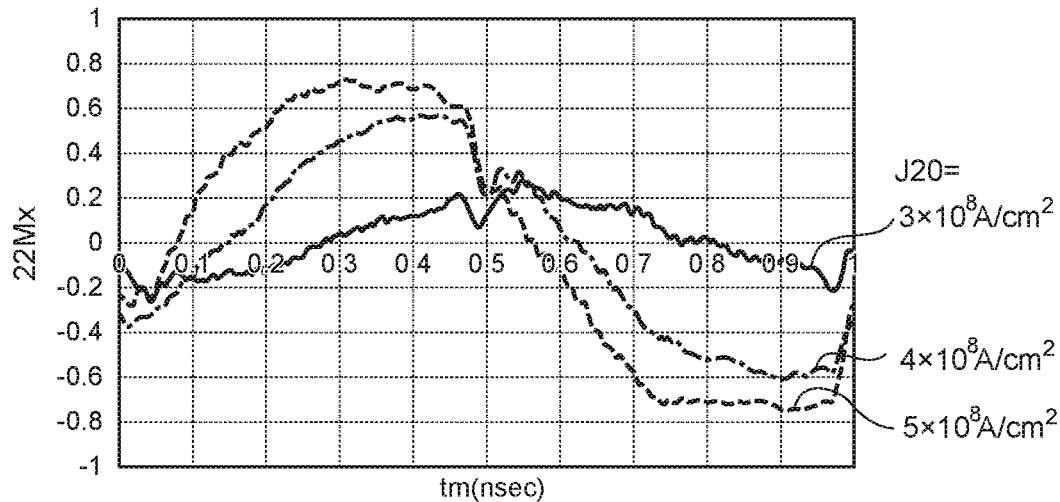

FIG. 11A to FIG. 11C are graphs illustrating characteristics of the magnetic head.

In FIG. 11A to FIG. 11C, the horizontal axis is a time tm (nsec). The vertical axis of FIG. 11A is an X-axis direction component 30Mx of the magnetization 30M. In FIG. 11B and FIG. 11C, the vertical axis is an X-axis direction component 22Mx of the magnetization 22M. In FIG. 11B, the current density J20 that flows in the stacked body 20 is $0 \times 10^8$ A/cm$^2$, $1 \times 10^8$ A/cm$^2$, or $2 \times 10^8$ A/cm$^2$. In FIG. 11C, the current density J20 that flows in the stacked body 20 is $3 \times 10^8$ A/cm$^2$, $4 \times 10^8$ A/cm$^2$, or $5 \times 10^8$ A/cm$^2$.

As shown in FIG. 11A, the magnetization 30M reverses in the range in which the time tm is not less than 0.4 nsec and not more than 0.5 nsec. When the time tm is not in this range, the magnetization 30M is saturated so that the +X axis direction or −X axis direction component substantially has a maximum.

As shown in FIG. 11B, the polarity of the component 22Mx is the same as the polarity of the component 30Mx when the current density J20 is $0 \times 10^8$ cm$^2$, $1 \times 10^8$ cm$^2$, or $2 \times 10^8$ cm$^2$. Conversely, as shown in FIG. 11C, the polarity of the component 22Mx is the reverse of the polarity of the component 30Mx when the current density J20 is $3 \times 10^8$ cm$^2$, $4 \times 10^8$ cm$^2$, or $5 \times 10^8$ cm$^2$.

The characteristics in the range in which the time tm is not less than 0.1 nsec and not more than 0.4 nsec affects the SN ratio or the bit error rate (BER). In the range in which the time tm is not less than 0.1 nsec and not more than 0.4 nsec, the component 22Mx changes from −1 (the −X axis direction) toward +1 (the +X axis direction) as the current density J20 increases. As the current density J20 increases, the magnetization 22M changes toward the reverse direction of the direction of the magnetization 30M.

Figure 12:
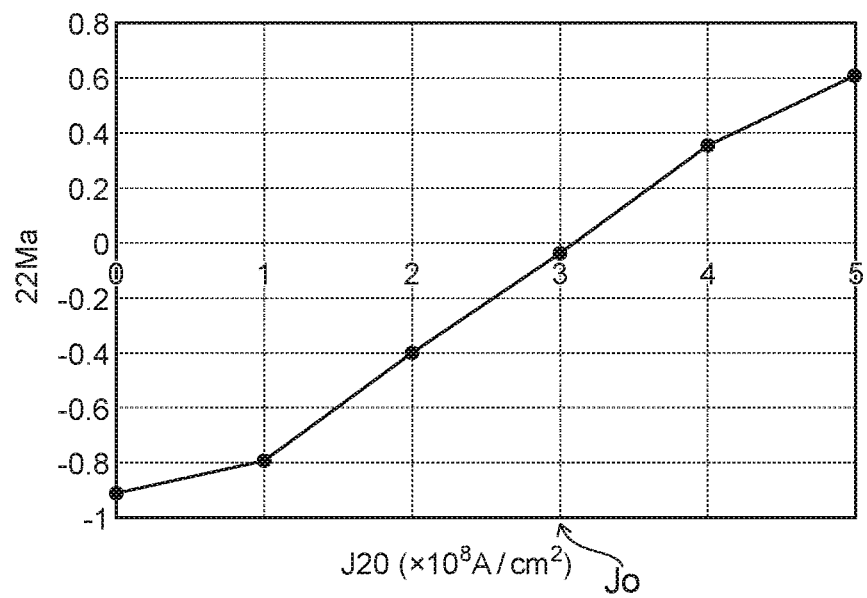
FIG. 12 is a graph illustrating a characteristic of the magnetic head.

FIG. 12 is a graph illustrating a characteristic of the magnetic head.

The horizontal axis of FIG. 12 is the current density J20 ($\times 10^8$ A/cm$^2$). The vertical axis of FIG. 12 is a parameter 22Ma relating to the magnetization 22M of the second magnetic layer 22. The parameter 22Ma is the component 22Mx averaged in the range in which the time tm is not less than 0.1 nsec and not more than 0.4 nsec.

As shown in FIG. 12, the parameter 22Ma changes monotonously from negative to positive as the current density J20 increases (from zero to $5 \times 10^8$ A/cm$^2$). In the example, the parameter 22Ma becomes zero when the current density J20 is about $3 \times 10^8$ A/cm$^2$ (a value Jo). The angle θm is 90 degrees at this time.

The angle θm is less than 90 degrees when the current density J20 is less than the value Jo. When the angle θm is greater than 90 degrees, the magnetization 22M of the second magnetic layer 22 has the reverse orientation of the magnetization 30M of the magnetic pole 30. By supplying the current density J20 that is greater than the value Jo to the stacked body 20, the magnetization 22M is caused to be the reverse of the magnetization 30M of the magnetic pole 30. Because the magnetization 22M has the reverse orientation of the magnetization 30M, the recording magnetic field from the magnetic pole 30 can be effectively oriented toward the magnetic recording medium 80. For example, compared to a recording head that does not use the stacked body 20, a high SN ratio is obtained. Compared to a recording head that does not use the stacked body 20, a high BER is obtained.

An example of the magnetic head and the magnetic recording medium according to the embodiment will now be described. The magnetic head 111 illustrated in FIG. 6 will be described. The description recited below is applicable to other magnetic heads according to the embodiment.

Figure 13:
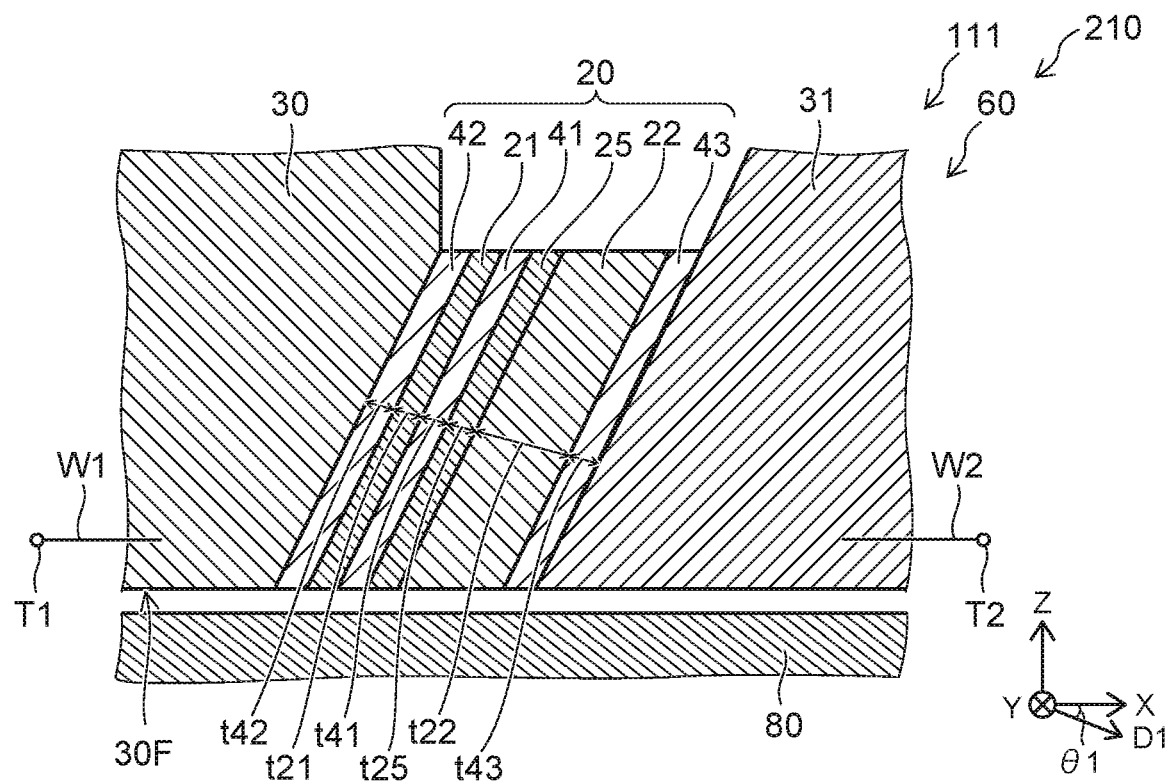
FIG. 13 is a schematic cross-sectional view illustrating the magnetic head according to the first embodiment.

FIG. 13 is a schematic cross-sectional view illustrating the magnetic head according to the first embodiment.

Figure 14:
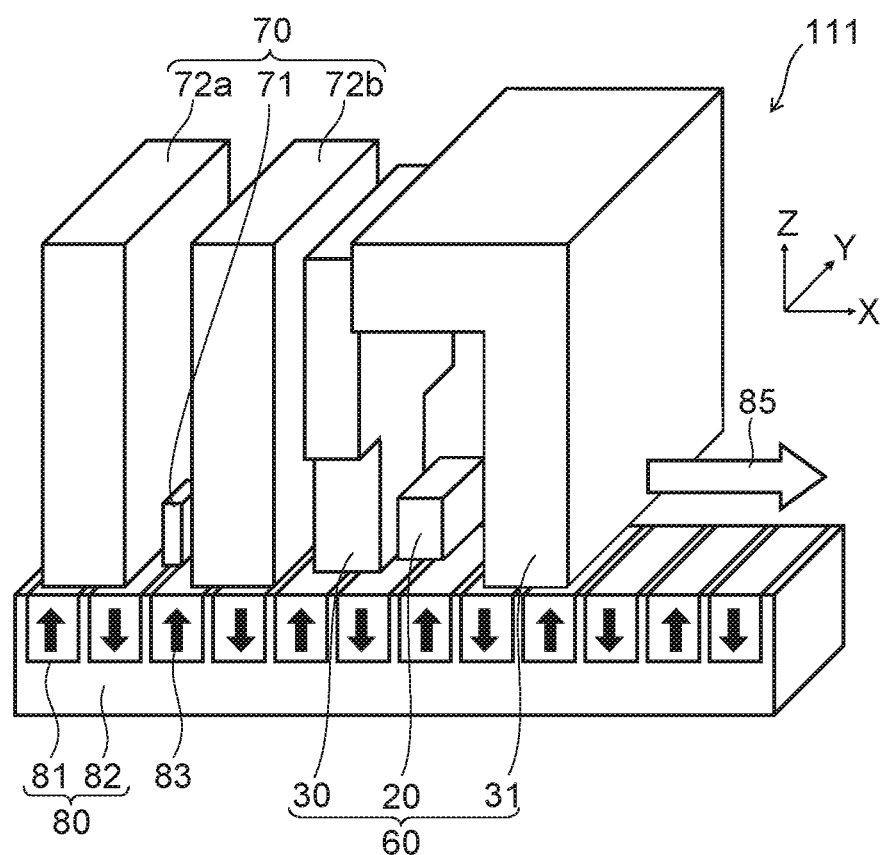
FIG. 14 is a schematic perspective view illustrating the magnetic recording device according to the first embodiment.

FIG. 14 is a schematic perspective view illustrating the magnetic recording device according to the first embodiment.

Figure 15:
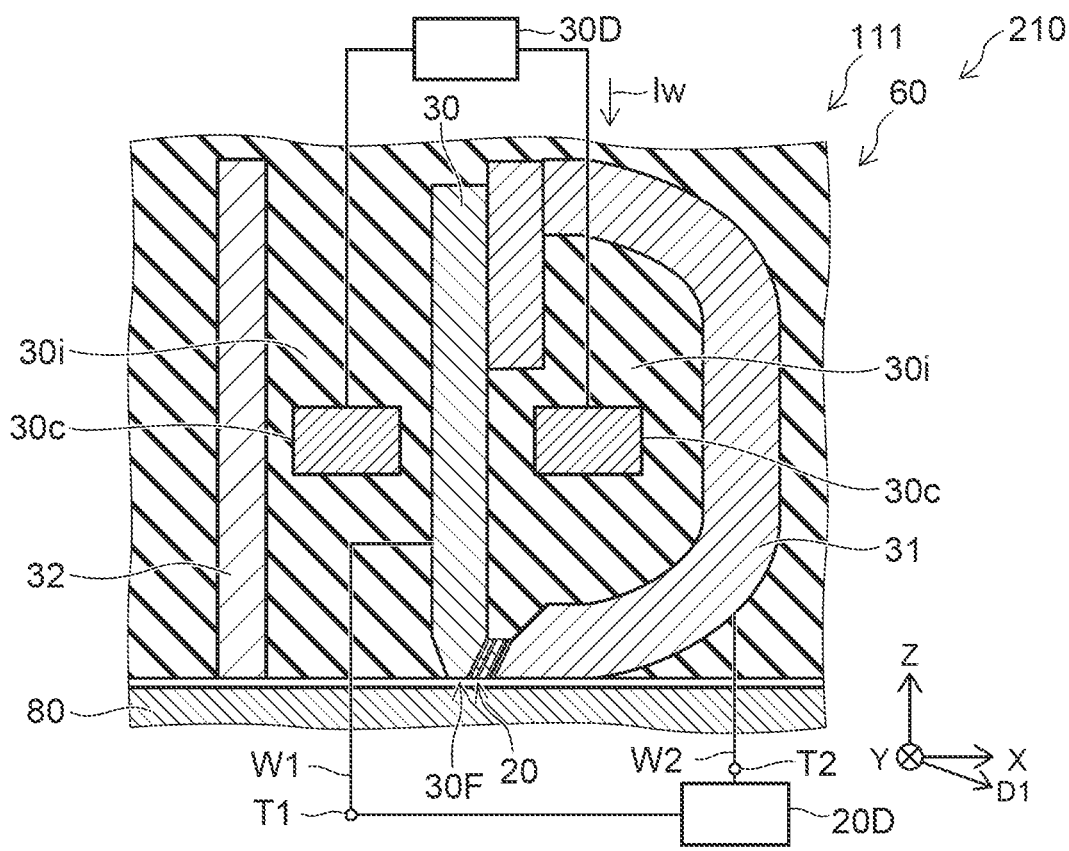
FIG. 15 is a schematic cross-sectional view illustrating the magnetic head according to the first embodiment.

FIG. 15 is a schematic cross-sectional view illustrating the magnetic head according to the first embodiment.

FIG. 13 is a partially enlarged view of FIG. 15.

As shown in FIG. 14, the magnetic head 111 according to the embodiment is used with the magnetic recording medium 80. The magnetic recording device 210 according to the embodiment includes the magnetic head 111 and the magnetic recording medium 80. In the example, the magnetic head 111 includes a recording portion 60 and a reproducing portion 70. Information is recorded in the magnetic recording medium 80 by the recording portion 60 of the magnetic head 111. The information that is recorded in the magnetic recording medium 80 is reproduced by the reproducing portion 70.

The magnetic recording medium 80 includes, for example, a medium substrate 82, and a magnetic recording layer 81 provided on the medium substrate 82. A magnetization 83 of the magnetic recording layer 81 is controlled by the recording portion 60.

The reproducing portion 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 14, the magnetic recording medium 80 moves relative to the magnetic head 111 in a medium movement direction 85. The information that corresponds to the magnetization 83 of the magnetic recording layer 81 at any position is controlled by the magnetic head 111. The information that corresponds to the magnetization 83 of the magnetic recording layer 81 at any position is reproduced by the magnetic head 111.

As shown in FIG. 15, a coil 30c is provided at the magnetic head 111. A recording current Iw is supplied from a recording circuit 30D to the coil 30c. A recording magnetic field that corresponds to the recording current Iw is applied from the magnetic pole 30 to the magnetic recording medium 80.

As shown in FIG. 15, the magnetic pole 30 includes a medium-facing surface 30F. The medium-facing surface 30F is, for example, an ABS (Air Bearing Surface). For example, the medium-facing surface 30F faces the magnetic recording medium 80.

A direction perpendicular to the medium-facing surface 30F is taken as a Z-axis direction. One direction perpendicular to the Z-axis direction is taken as the X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

As shown in FIG. 15, the electrical circuit 20D is electrically connected to the stacked body 20. In the example, the stacked body 20 is electrically connected to the magnetic pole 30 and the first shield 31. A first terminal T1 and a second terminal T2 are provided in the magnetic head 111. The first terminal T1 is electrically connected to the stacked body 20 via wiring W1 and the magnetic pole 30. The second terminal T2 is electrically connected to the stacked body 20 via wiring W2 and the first shield 31. For example, a current (e.g., a direct current) is supplied from the electrical circuit 20D to the stacked body 20.

As shown in FIG. 15, a second shield 32 may be provided in the recording portion 60. The magnetic pole 30 is provided between the second shield 32 and the first shield 31. An insulating portion 30i is provided around the first shield 31, the second shield 32, and the magnetic pole 30.

In the example as shown in FIG. 13, a first direction D1 from the magnetic pole 30 toward the first shield 31 may be tilted with respect to the X-axis direction. The first direction D1 corresponds to the stacking direction of the stacked body 20. The X-axis direction is along the medium-facing surface 30F of the magnetic pole 30. The angle between the first direction D1 and the medium-facing surface 30F is taken as an angle θ1. The angle θ1 is, for example, not less than 15 degrees and not more than 30 degrees. The angle θ1 may be 0 degrees.

When the first direction D1 is tilted with respect to the X-axis direction, the thicknesses of the layers (e.g., the thickness t21, etc.) correspond to lengths along the first direction D1.

Second Embodiment

A second embodiment relates to the magnetic recording device 210. The magnetic recording device 210 includes the magnetic head 110, and the magnetic recording medium 80 in which the information is recorded by the magnetic head 110. An example of the magnetic recording device according to the embodiment will now be described. The magnetic recording device may be a magnetic recording and reproducing device. The magnetic head may include a recording portion and a reproducing portion.

Figure 16:
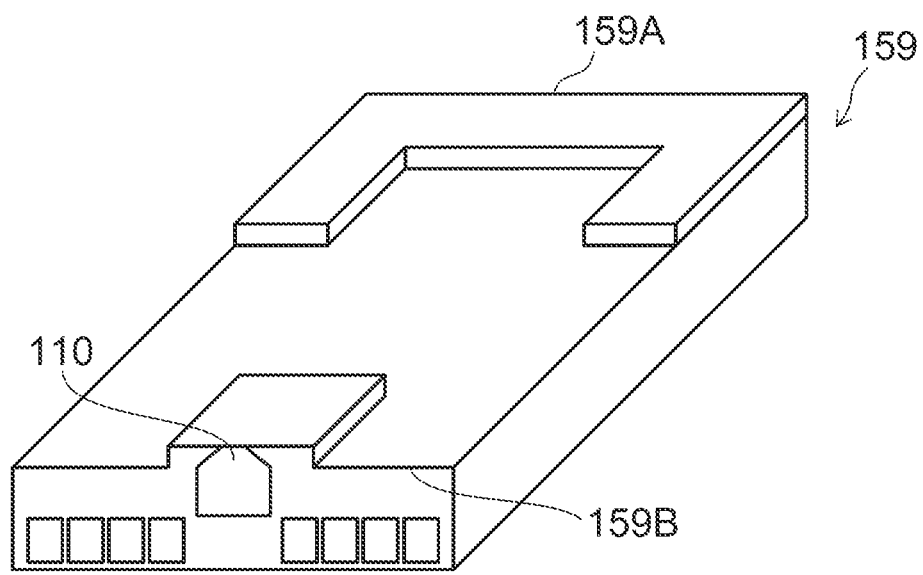
FIG. 16 is a schematic perspective view illustrating a portion of the magnetic recording device according to the second embodiment.

FIG. 16 is a schematic perspective view illustrating a portion of the magnetic recording device according to the second embodiment.

FIG. 16 illustrates a head slider. The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 17:
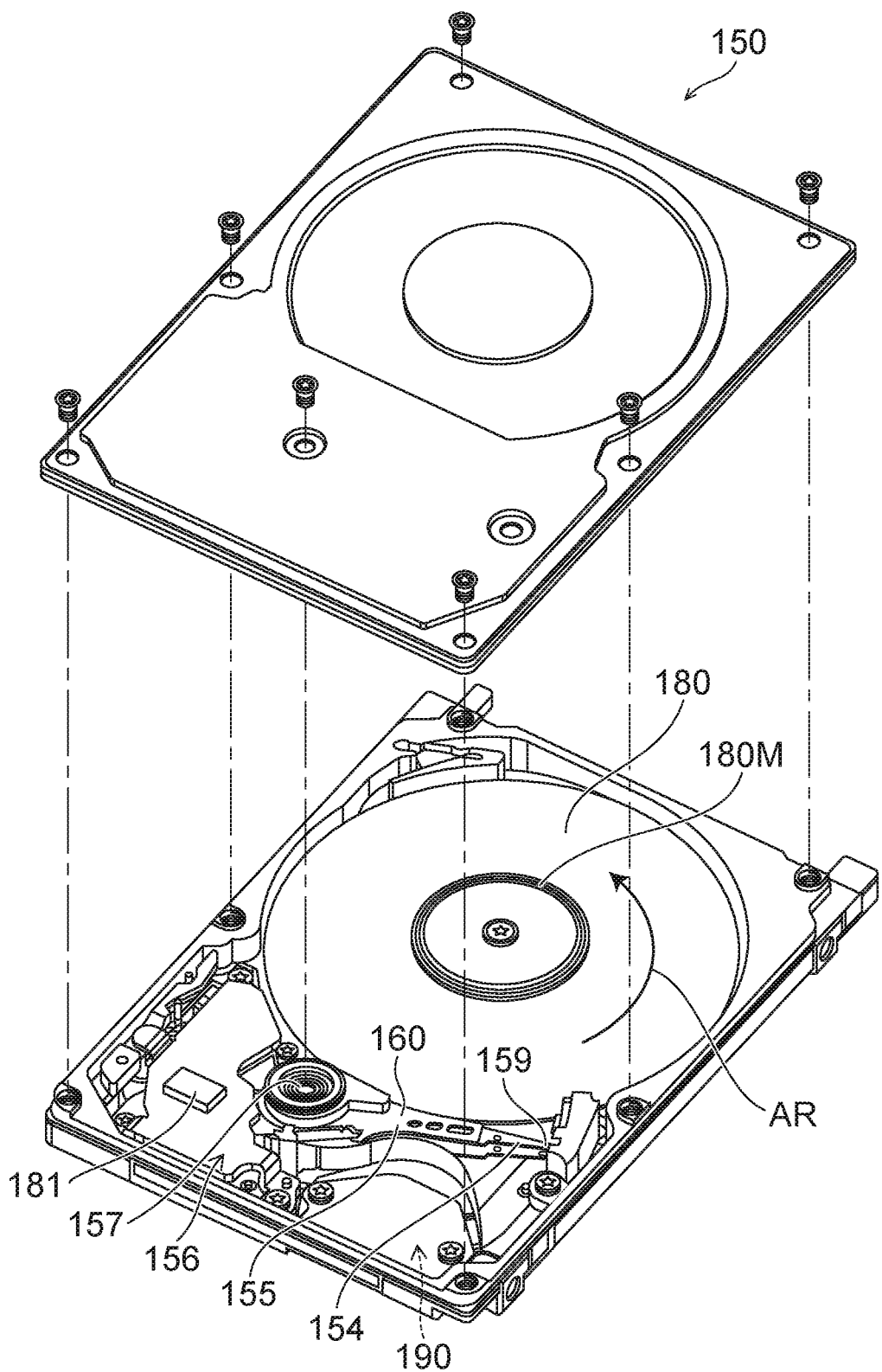
FIG. 17 is a schematic perspective view illustrating the magnetic recording device according to the second embodiment.

FIG. 17 is a schematic perspective view illustrating the magnetic recording device according to the second embodiment.

Figure 18A:
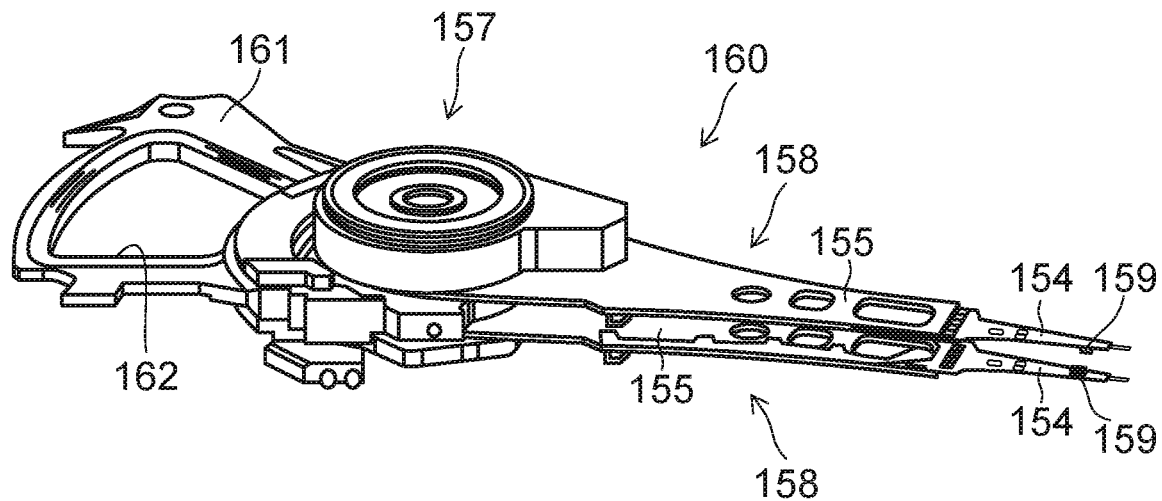
FIG. 18A and FIG. 18B are schematic perspective views illustrating a portion of the magnetic recording device according to the second embodiment.
Figure 18B:
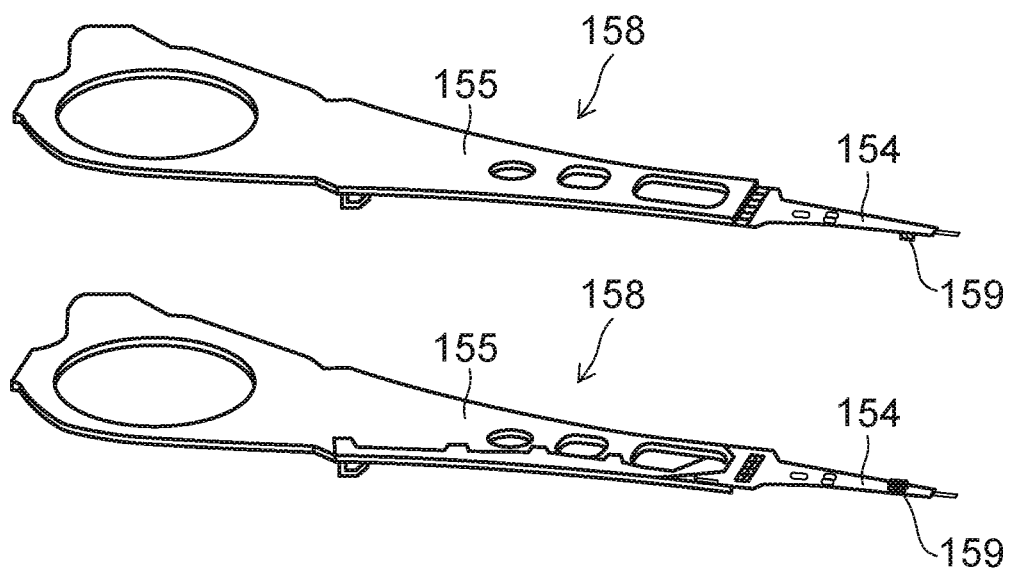

FIG. 18A and FIG. 18B are schematic perspective views illustrating a portion of the magnetic recording device according to the second embodiment.

As shown in FIG. 17, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 18A illustrates the configuration of a portion of the magnetic recording device and is an enlarged perspective view of a head stack assembly 160.

FIG. 18B is a perspective view illustrating a magnetic head assembly (a head gimbal assembly (HGA)) 158 that is a portion of the head stack assembly 160.

As shown in FIG. 18A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 18B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The embodiments may include the following configurations (e.g., technological proposals).

Configuration 1

A magnetic recording device, comprising:
a magnetic head; and
an electrical circuit,
the magnetic head including
  a magnetic pole,
  a first shield, and
  a stacked body provided between the magnetic pole and the first shield,
the stacked body including
  a first magnetic layer,
  a second magnetic layer, and
  a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and
  a first nonmagnetic layer provided between the first magnetic layer and the first layer,
a change rate of an electrical resistance of the stacked body with respect to a change of a current density flowing in the stacked body has
  a first value when the current density is in a first range,
  a second value when the current density is in a second range, and
  a third value when the current density is in a third range,
the second range being between the first range and the third range, the second value being greater than the first value and greater than the third value,
the electrical circuit supplying, to the stacked body, a current of a current density within the third range.

Configuration 2

The magnetic recording device according to Configuration 1, wherein
the first layer contacts the first nonmagnetic layer and the second magnetic layer.

Configuration 3

The magnetic recording device according to Configuration 2, wherein the first nonmagnetic layer contacts the first magnetic layer and the first layer.

Configuration 4

The magnetic recording device according to any one of Configurations 1 to 3, wherein
the second magnetic layer is between the first magnetic layer and the first shield.

Configuration 5

The magnetic recording device according to any one of Configurations 1 to 4, wherein
the first magnetic layer includes:
a first element including at least one selected from the group consisting of Fe, Ni, and Co; and
a second element including at least one selected from the group consisting of Cr, V, Mn, Ti, and Sc.

Configuration

The magnetic recording device according to Configuration 5, wherein
the first magnetic layer includes an alloy including the first and second elements.

Configuration 7

The magnetic recording device according to any one of Configurations 1 to 6, wherein
the second magnetic layer includes at least one selected from the group consisting of a first material layer, a second material layer, and a third material layer,
the first material layer includes CoFe,
the second material layer includes a first CoFe layer, a second CoFe layer, and a NiFe layer provided between the first CoFe layer and the second CoFe layer, and
the third material layer includes a plurality of CoFe layers, and a Ni layer provided between the plurality of CoFe layers.

Configuration 8

The magnetic recording device according to any one of Configurations 1 to 7, wherein
the first nonmagnetic layer includes at least one selected from the group consisting of Cr, Cu, Ag, and Au.

Configuration 9

The magnetic recording device according to any one of Configurations 1 to 8, wherein
a thickness of the first magnetic layer is not less than 1 nm but less than 8 nm.

Configuration 10

The magnetic recording device according to any one of Configurations 1 to 9, wherein
a thickness of the first layer is not less than 0.5 nm but less than 3 nm.

Configuration 11

The magnetic recording device according to any one of Configurations 1 to 10, wherein
a thickness of the first nonmagnetic layer is not less than 1 nm and not more than 4 nm.

Configuration 12

The magnetic recording device according to any one of Configurations 1 to 11, wherein
a thickness of the second magnetic layer is not less than 3 nm and not more than 9 nm.

Configuration 13

The magnetic recording device according to any one of Configurations 1 to 12, wherein
the stacked body further includes a second nonmagnetic layer,
the first magnetic layer is between the second nonmagnetic layer and the first nonmagnetic layer,
the second nonmagnetic layer includes at least one selected from the group consisting of Ta, Cr, and Cu, and
a thickness of the second nonmagnetic layer is not less than 2 nm and not more than 5 nm.

Configuration 14

The magnetic recording device according to any one of Configurations 1 to 13, wherein
the stacked body further includes a third nonmagnetic layer,
the second magnetic layer is between the first layer and the third nonmagnetic layer,
the third nonmagnetic layer includes at least one selected from the group consisting of Cr, Cu, Ag, and Au, and
a thickness of the third nonmagnetic layer is not less than 1 nm and not more than 4 nm.

Configuration 15

The magnetic recording device according to Configuration 14, wherein
the stacked body further includes a third magnetic layer, and
the third nonmagnetic layer is between the second magnetic layer and the third magnetic layer.

Configuration 16

The magnetic recording device according to any one of Configurations 1 to 4, wherein
the stacked body further includes a third nonmagnetic layer and a third magnetic layer,
the third nonmagnetic layer is between the second magnetic layer and the third magnetic layer,
the third magnetic layer includes:
a third element including at least one selected from the group consisting of Fe, Ni, and Co; and
a fourth element including at least one selected from the group consisting of Cr, V, Mn, Ti, and Sc,
the first magnetic layer and the second magnetic layer each include at least one selected from the group consisting of a first material layer, a second material layer, and a third material layer,
the first material layer includes CoFe,
the second material layer includes a first CoFe layer, a second CoFe layer, and a NiFe layer provided between the first CoFe layer and the second CoFe layer, and the third material layer includes a plurality of CoFe layers, and a Ni layer provided between the plurality of CoFe layers.

Configuration 17

The magnetic recording device according to any one of Configurations 1 to 12, wherein
the first magnetic layer contacts the magnetic pole.

Configuration 18

The magnetic recording device according to any one of Configurations 1 to 13, wherein
the stacked body further includes a third nonmagnetic layer,
the second magnetic layer is between the first layer and the third nonmagnetic layer,
the third nonmagnetic layer includes at least one selected from the group consisting of Cr, Cu, Ag, and Au, and
a thickness of the third nonmagnetic layer is not less than 1 nm and not more than 4 nm.

Configuration 19

The magnetic recording device according to any one of Configurations 1 to 12, wherein
the stacked body further includes a second layer and a third nonmagnetic layer,
the second magnetic layer is between the first layer and the third nonmagnetic layer,
the second layer is between the second magnetic layer and the third nonmagnetic layer, and
the second layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu.

Configuration 20

The magnetic recording device according to Configuration 19, wherein
the third nonmagnetic layer includes at least one selected from the group consisting of Cr, Cu, Ag, and Au, and
a thickness of the third nonmagnetic layer is not less than 1 nm and not more than 4 nm.

Configuration 21

The magnetic recording device according to any one of Configurations 1 to 20, wherein
the first shield includes Co and Fe.

Configuration 22

The magnetic recording device according to any one of Configurations 1 to 21, further comprising:
a magnetic recording medium, information being recorded in the magnetic recording medium by the magnetic head,
the stacked body not generating an alternating-current magnetic field, or a frequency of an alternating-current magnetic field generated from the stacked body being greater than a magnetic resonant frequency of the magnetic recording medium.

Configuration 23

A magnetic recording device, comprising:
a magnetic head; and
a magnetic recording medium, information being recorded in the magnetic recording medium by the magnetic head,
the magnetic head including
 a magnetic pole,
 a first shield, and
 a stacked body provided between the magnetic pole and the first shield,
the stacked body including
 a first magnetic layer,
 a second magnetic layer,
 a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and
 a first nonmagnetic layer provided between the first magnetic layer and the first layer,
the stacked body not generating an alternating-current magnetic field, or a frequency of an alternating-current magnetic field generated from the stacked body being greater than a magnetic resonant frequency of the magnetic recording medium.

Configuration 24

A magnetic head, comprising:
a magnetic pole;
a first shield; and
a stacked body provided between the magnetic pole and the first shield,
the stacked body including
 a first magnetic layer,
 a second magnetic layer,
 a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and
 a first nonmagnetic layer provided between the first magnetic layer and the first layer,
a change rate of an electrical resistance of the stacked body with respect to a change of a current density flowing in the stacked body has
 a first value when the current density is in a first range,
 a second value when the current density is in a second range, and
 a third value when the current density is in a third range,
the second range being between the first range and the third range, the second value being greater than the first value and greater than the third value,
a current of a current density within the third range being supplied to the stacked body.

Configuration 25

A magnetic head, comprising:
a magnetic pole;
a first shield; and
a stacked body provided between the magnetic pole and the first shield,
the stacked body including
 a first magnetic layer,
 a second magnetic layer, a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and a first nonmagnetic layer provided between the first magnetic layer and the first layer, a thickness of the second magnetic layer being not less than 3 nm and not more than 9 nm.

Configuration 26

The magnetic head according to Configuration 25, wherein
the first magnetic layer includes:
a first element including at least one selected from the group consisting of Fe, Ni, and Co; and
a second element including at least one selected from the group consisting of Cr, V, Mn, Ti, and Sc.

Configuration 27

The magnetic head according to Configuration 25 or 26, wherein
the stacked body further includes a second nonmagnetic layer,
the first magnetic layer is between the second nonmagnetic layer and the first nonmagnetic layer,
the second nonmagnetic layer includes at least one selected from the group consisting of Ta, Cr, and Cu, and
a thickness of the second nonmagnetic layer is not less than 2 nm and not more than 5 nm.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, nonmagnetic layers, layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a magnetic pole;
a first shield; and
a stacked body provided between the magnetic pole and the first shield,
the stacked body including
a first magnetic layer,
a second magnetic layer,
a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and
a first nonmagnetic layer provided between the first magnetic layer and the first layer,
a change rate of an electrical resistance of the stacked body with respect to a change of a current density flowing in the stacked body has
a first value when the current density is in a first range,
a second value when the current density is in a second range, and
a third value when the current density is in a third range,
the second range being between the first range and the third range, the second value being greater than the first value and greater than the third value,
a current of a current density within the third range being supplied to the stacked body.

2. A magnetic recording device, comprising:
a magnetic head; and
an electrical circuit,
the magnetic head including
a magnetic pole,
a first shield, and
a stacked body provided between the magnetic pole and the first shield,
the stacked body including
a first magnetic layer,
a second magnetic layer,
a first layer provided between the first magnetic layer and the second magnetic layer, the first layer including at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu, and
a first nonmagnetic layer provided between the first magnetic layer and the first layer,
a change rate of an electrical resistance of the stacked body with respect to a change of a current density flowing in the stacked body has
a first value when the current density is in a first range, a second value when the current density is in a second range, and a third value when the current density is in a third range, the second range being between the first range and the third range, the second value being greater than the first value and greater than the third value, the electrical circuit supplying, to the stacked body, a current of a current density within the third range.

3. The device according to claim 2, wherein the first layer contacts the first nonmagnetic layer and the second magnetic layer.

4. The device according to claim 3, wherein the first nonmagnetic layer contacts the first magnetic layer and the first layer.

5. The device according to claim 2, wherein the second magnetic layer is between the first magnetic layer and the first shield.

6. The device according to claim 2, wherein the first magnetic layer includes:
 a first element including at least one selected from the group consisting of Fe, Ni, and Co; and
 a second element including at least one selected from the group consisting of Cr, V, Mn, Ti, and Sc.

7. The device according to claim 6, wherein the first magnetic layer includes an alloy including the first and second elements.

8. The device according to claim 2, wherein the second magnetic layer includes at least one selected from the group consisting of a first material layer, a second material layer, and a third material layer,
the first material layer includes CoFe,
the second material layer includes a first CoFe layer, a second CoFe layer, and a NiFe layer provided between the first CoFe layer and the second CoFe layer, and
the third material layer includes a plurality of CoFe layers, and a Ni layer provided between the plurality of CoFe layers.

9. The device according to claim 2, wherein the first nonmagnetic layer includes at least one selected from the group consisting of Cr, Cu, Ag, and Au.

10. The device according to claim 2, wherein a thickness of the first magnetic layer is not less than 1 nm but less than 8 nm.

11. The device according to claim 2, wherein a thickness of the first layer is not less than 0.5 nm but less than 3 nm.

12. The device according to claim 2, wherein a thickness of the first nonmagnetic layer is not less than 1 nm and not more than 4 nm.

13. The device according to claim 2, wherein a thickness of the second magnetic layer is not less than 3 nm and not more than 9 nm.

14. The device according to claim 2, wherein the stacked body further includes a second nonmagnetic layer, the first magnetic layer is between the second nonmagnetic layer and the first nonmagnetic layer, the second nonmagnetic layer includes at least one selected from the group consisting of Ta, Cr, and Cu, and a thickness of the second nonmagnetic layer is not less than 2 nm and not more than 5 nm.

15. The device according to claim 2, wherein the stacked body further includes a third nonmagnetic layer, the second magnetic layer is between the first layer and the third nonmagnetic layer, the third nonmagnetic layer includes at least one selected from the group consisting of Cr, Cu, Ag, and Au, and a thickness of the third nonmagnetic layer is not less than 1 nm and not more than 4 nm.

16. The device according to claim 15, wherein the stacked body further includes a third magnetic layer, and the third nonmagnetic layer is between the second magnetic layer and the third magnetic layer.

17. The device according to claim 2, wherein the stacked body further includes a third nonmagnetic layer and a third magnetic layer, the third nonmagnetic layer is between the second magnetic layer and the third magnetic layer, the third magnetic layer includes:
 a third element including at least one selected from the group consisting of Fe, Ni, and Co; and
 a fourth element including at least one selected from the group consisting of Cr, V, Mn, Ti, and Sc, the first magnetic layer and the second magnetic layer each include at least one selected from the group consisting of a first material layer, a second material layer, and a third material layer, the first material layer includes CoFe, the second material layer includes a first CoFe layer, a second CoFe layer, and a NiFe layer provided between the first CoFe layer and the second CoFe layer, and the third material layer includes a plurality of CoFe layers, and a Ni layer provided between the plurality of CoFe layers.

18. The device according to claim 2, wherein the first magnetic layer contacts the magnetic pole.

19. The device according to claim 2, wherein the stacked body further includes a second layer and a third nonmagnetic layer, the second magnetic layer is between the first layer and the third nonmagnetic layer, the second layer is between the second magnetic layer and the third nonmagnetic layer, and the second layer includes at least one selected from the group consisting of Ta, Zr, Hf, Mo, W, Tc, Re, Ru, Rh, Os, Ir, Pd, Pt, Mn, Cr, V, Ti, Sc, Y, La, Ce, Pr, Nd, Pm, Sm, Eu, Gd, Tb, Dy, Ho, Er, Tm, Yb, and Lu.

* * * * *